(12) United States Patent
Simic et al.

(10) Patent No.: US 6,961,367 B2
(45) Date of Patent: Nov. 1, 2005

(54) FORWARD LINK REPEATER FREQUENCY WATERMARKING SCHEME

(75) Inventors: Emilija Simic, La Jolla, CA (US); Christopher Patrick, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 281 days.

(21) Appl. No.: 10/392,442

(22) Filed: Mar. 17, 2003

(65) Prior Publication Data

US 2004/0165657 A1 Aug. 26, 2004

Related U.S. Application Data

(60) Provisional application No. 60/449,774, filed on Feb. 24, 2003.

(51) Int. Cl.$^7$ ............................................... H04B 7/185
(52) U.S. Cl. .................... 375/214; 375/271; 375/302; 375/340; 455/12.1; 455/23; 455/550.1; 455/456.1; 370/316
(58) Field of Search ............................... 375/211, 214, 375/219, 302, 271, 340; 455/20, 11.1, 23, 550.1, 12.1, 456.1; 370/315, 316

(56) References Cited

U.S. PATENT DOCUMENTS

| | | | |
|---|---|---|---|
| 6,108,364 A | 8/2000 | Weaver, Jr. et al. | 375/130 |
| 6,438,381 B1 | 8/2002 | Alberth, Jr. et al. | 455/456 |
| 6,501,955 B1 | 12/2002 | Durrant et al. | 455/456 |
| 6,690,662 B1 * | 2/2004 | Komara et al. | 370/342 |
| 2002/0044594 A1 * | 4/2002 | Bongfeldt | 375/213 |
| 2003/0186691 A1 * | 10/2003 | Baek | 455/420 |

* cited by examiner

*Primary Examiner*—Amanda T. Le
(74) *Attorney, Agent, or Firm*—Philip Wadsworth; Bruce W. Greenhaus; Donald Kordich

(57) ABSTRACT

A forward link repeater frequency watermarking (FLRFWM) system and method that enable accurate position location of mobile stations in areas where repeaters are present by watermarking repeated signals with repeater information. A repeater watermarks a forward link signal with a (unique or non-unique) fast frequency modulation waveform watermark every time a signal passes through the repeater. A mobile station detects and/or identifies the fast frequency watermark on the forward link signal to determine repeater information that aids the network position determination entity or mobile station position location system in determining position location using AFLT and/or A-GPS systems. A forward link fast frequency watermarking system described herein achieves minimal impact on FL, AFLT, and GPS performance, good detection, identification and false alarm probabilities, short time-to-detect/identify, and good detection/identification sensitivity.

35 Claims, 10 Drawing Sheets

FORWARD LINK REPEATER FREQUENCY WATERMARKING SCHEME

CROSS-REFERENCE TO RELATED APPLICATION

Priority is hereby claimed to U.S. Provisional Application No. 60/449,774, filed Feb. 24, 2003, entitled FORWARD LINK REPEATER FREQUENCY WATERMARKING SCHEME.

BACKGROUND OF THE INVENTION

1. Field of the Invention

This invention relates to position location systems that utilize wireless signals to determine the location of an electronic mobile device.

2. Description of Related Art

Existing position location technologies based on GPS use a network of satellites in earth orbit that transmit signals at a known time. A GPS receiver on the ground measures the time-of-arrival of the signals from each satellite in the sky that it can "see". The time-of-arrival of the signal along with the exact location of the satellites and the exact time the signal was transmitted from each satellite is used to triangulate the position of the GPS receiver. A GPS receiver requires four satellites to make a triangulation and the performance of the resulting position location increases as the number of satellites that can be detected increases.

One problem with GPS-based position location determination arises if only three (or less) satellites can be found, and in such an instance (and in the absence of other ancillary information) it is not possible to accurately locate the GPS receiver. For example, if the GPS receiver's view of the sky is obstructed (e.g., deep inside a concrete building) it may not be possible to obtain enough GPS measurements to determine receiver location.

For a wireless communication receiver (i.e. mobile station), the existing wireless network of base stations can be used for position location purposes in a similar manner as the network of GPS satellites for GPS receiver. Theoretically-speaking, the exact location of each base station, the exact time at which the base station is transmitting, and the time-of-arrival of the base station's signal at a mobile station (e.g. cell phone) can be used to trilaterate the position of the mobile station. This technique is referred to as Advanced Forward Link Trilateration (AFLT).

The AFLT method may be used by itself for position location purposes; alternatively, in order to enhance performance of a GPS system, the existing network of wireless communication base stations can be treated as a secondary network of "satellites" for position location purposes in a GPS-capable mobile station (i.e., a device that includes both GPS and wireless communication receivers). The AFLT technique, combined with GPS algorithms, is referred to as hybrid, or Assisted-GPS (A-GPS).

AFLT is a method for determining the position of a mobile station using a plurality of wireless communication network base stations each emitting a unique pilot signal. The AFLT method includes taking a plurality of data measurements of the pilot signals from each of the plurality of base stations, including taking measurements on the pilot signals present in the mobile station's active, candidate, and neighbor pilot sets, in the current embodiment. Each of the data measurements includes an earliest time-of-arrival estimate for each pilot signal. In some embodiments, the data measurements further include an RMSE estimate, time of measurement for each time-of-arrival, and an energy measurement (e.g., Ec/Io) for all resolvable paths of the pilot signal.

The data measurements obtained by the AFLT algorithm may be used alone to determine mobile station position; alternatively one or more of the representative AFLT measurements may be used together with representative GPS measurements to determine the position of the mobile station. In some embodiments the mobile station comprises a cell phone and the method further comprises wirelessly connecting the cell phone to one of the cellular base stations prior to taking data; the base station provides a cell search list to the cell phone of all cellular base stations in the area from which data measurements may be taken. In embodiments that include a GPS system, a base station can also provide a GPS search list, which can be used to reduce the time necessary for the mobile station to perform the GPS search and thus to reduce time-to-fix.

In practice, AFLT (including A-GPS) has proven to be of only limited success for position location purposes, in part because repeaters employed in wireless networks cause an ambiguity as to the point of transmission of the pilot signal. In other words, a mobile station cannot currently distinguish whether received signal was transmitted from the donor Base Transceiver Station (BTS) or the repeater. Because the point of transmission of the pilot signal is unknown (e.g., whether directly from a donor BTS or through a repeater), the AFLT measurement cannot be used to accurately determine position. In addition, the repeater will also have internal delays, typically in a range from hundreds of nanoseconds up to tens of microseconds, potentially resulting in a position location error in the range of about 24.4 meters (for 100 nanoseconds) to about 2.44 kilometers (for 10 microseconds).

In one conventional embodiment, a solution to the repeater problem is to exclude all AFLT measurements in the areas where repeaters are present. However, this solution completely precludes AFLT position location and any AFLT portion of A-GPS from being utilized in many locations, thus reducing position location availability and yield, and increasing GPS search windows, resulting in longer times-to-fix.

It has been suggested to introduce a signature on the reverse link, as described in U.S. Pat. No. 6,501,955 in order to help position determination. Unfortunately, the RL signature is expected to be of only limited assistance in mitigating the effects of repeaters on position location, because the mobile station uses AFLT measurements from the forward link for position location. As there is no guarantee that the forward link back to the mobile station will follow the same path as the reverse link from the mobile station (i.e., through the same repeater), the reverse link signature is expected to be suboptimal for identifying repeater information for position location purposes. Introducing a signature onto the FL signal has also been suggested, such as described in U.S. Pat. No. 6,501,955, however no practical solution has yet been developed.

SUMMARY OF THE INVENTION

A forward link repeater frequency watermarking (FLRFWM) system and method are disclosed that enable position location determination in areas where repeaters are present by watermarking repeated signals with repeater information. The FLRFWM system includes a repeater that watermarks a forward link signal with a fast frequency modulation waveform as it passes through the repeater and a mobile station that detects and identifies the fast frequency modulation waveform. The fast frequency watermark includes repeater information that may be used to determine the position of the mobile station in an area where repeaters are present, using AFLT and/or A-GPS position location systems. The repeater information may simply indicate that the signal is repeated, or may uniquely identify the repeater through which the FL signal passed. The watermark is introduced on the forward link such that each AFLT measurement can be repeater-screened and thereby used for position location. Forward link fast frequency watermarking achieves minimal impact on FL, AFLT, and GPS performance, good detection, identification and false alarm probabilities, short time-to-detect/identify, and good detection/identification sensitivity.

A repeater is disclosed that includes an amplifier for amplifying the forward link signal from a base station to a mobile station and a fast frequency modulator that frequency modulates the forward link signal with an identifying fast frequency watermark as it passes through the repeater. The fast frequency watermark has a frequency such that the frequency tracking loop at the mobile station substantially does not detect the watermark in order to minimize the adverse impact on AFLT and GPS performance. Furthermore, the fast frequency watermark has an amplitude designed to minimize the adverse effect on FL performance.

In some embodiments, the watermark is defined by a modulation waveform that that is substantially periodic with a period of 2T. The half period T of the waveform is substantially less than the time constant of the mobile station frequency tracking loop, e.g., less than about 1/60 of the time constant of the frequency tracking loop, such that the frequency tracking loop at the mobile station substantially does not detect the watermark. In some embodiments, the periodic waveform may be a square waveform with an amplitude less than or equal to about 50 Hz. In some embodiments, the periodic waveform uniquely identifies a repeater by having a unique value of T, thus allowing for identification of the repeater at the mobile. In other embodiments, all repeaters will have a periodic waveform with the same value of T, thus allowing only repeater detection at mobile.

In some embodiments, the watermark is defined by a modulation waveform that is non-periodic, e.g., a BPSK-, QPSK-, or OQPSK-encoded waveform with a bit duration of 2T. The half bit duration T of the waveform in these embodiments is substantially less than the time constant of the mobile station frequency tracking loop, such that the frequency tracking loop at the mobile station substantially does not detect the watermark. In some embodiments, the non-periodic waveform has an amplitude less than or equal to about 50 Hz. In some embodiments, the non-periodic waveform uniquely identifies a repeater by having a unique sequence of bits, thus allowing for identification of repeater at mobile. In other embodiments, all repeaters will have the same non-periodic waveform with the same sequence of bits, thus allowing only repeater detection at mobile.

A mobile station is disclosed that receives a plurality of forward link pilot signals and identifies the presence of a fast frequency watermark waveform to determine whether any of the forward link signals are repeated. The mobile station includes a receiver for receiving forward link signals, a frequency tracking loop for enabling accurate demodulation of the FL signals, and an AFLT searcher. The AFLT searcher detects pilots and performs pilot phase measurements, including measuring the times-of-arrival of the plurality of forward link pilot signals. The mobile station also includes a repeater identification system configured to detect and/or identify the watermark on a FL signal, if any. The repeater identification system detects the repeater on a FL signal by searching the forward link signal for the presence of the watermark waveform. The repeater identification system identifies a repeater on a forward link signal by searching the forward link signal for the presence of the watermark waveform, retrieving the watermark waveform if present, and looking for a property of the watermark waveform that uniquely identifies the repeater. The frequency tracking loop substantially does not detect the watermark waveform because of its fast frequency.

A method for determining position location information of a mobile station is also disclosed. The method includes determining position location information from the forward link of a plurality of pilot signals in an area where repeaters may be present. The method begins by performing an AFLT search in the mobile station to detect pilots and measure an earliest time-of-arrival of the plurality of pilot signals. The mobile station then selects a first pilot signal located during the AFLT search and repeater screens the first pilot signal by performing a repeater AFLT search on the first pilot signal, including searching for a fast frequency watermark waveform that identifies a repeated signal. The frequency of the watermark waveform is such that a frequency tracking loop in the mobile station substantially does not detect the watermark at the mobile station. The method continues by repeating the steps of selecting and repeater screening for a plurality of other selected pilot signals until a sufficient number of repeater-screened pilot signals to determine a position location of the mobile station is obtained. Finally, the pilot phase measurements and repeater information for the pilot signals obtained in the AFLT search is provided to either a mobile station position determining system or a network position determination entity to determine the position of the mobile station.

Repeater information obtained during the repeater search should at minimum contain the information as to whether the pilot signal was successfully repeater-screened or not, and if it has, whether the pilot signal was repeated or not. In one embodiment, the repeater information contains only an indication of whether or not the pilot signal was successfully repeater-screened, and if yes, whether or not the signal is repeated, such that the mobile station position determining system or network position determination entity may determine the position of the mobile station by excluding measurements from repeated pilot signals and from any pilots that have not been successfully repeater-screened.

In another embodiment, the repeater AFLT search identifies a repeater ID from the watermark waveform, if one present. In this embodiment, the repeater information obtained during repeater search and provided to the mobile station position determining system or a network position determination entity also includes the repeater ID for each pilot signal identified as repeated, which allows the use of the repeated signal measurements in calculating position.

In some embodiments, where A-GPS is used to determine position location, a GPS search is performed prior to performing the repeater AFLT search. If sufficient GPS measurements for position location determination are obtained, the repeater AFLT search may be skipped in the interest of reducing time-to-fix.

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION

Figure 1:
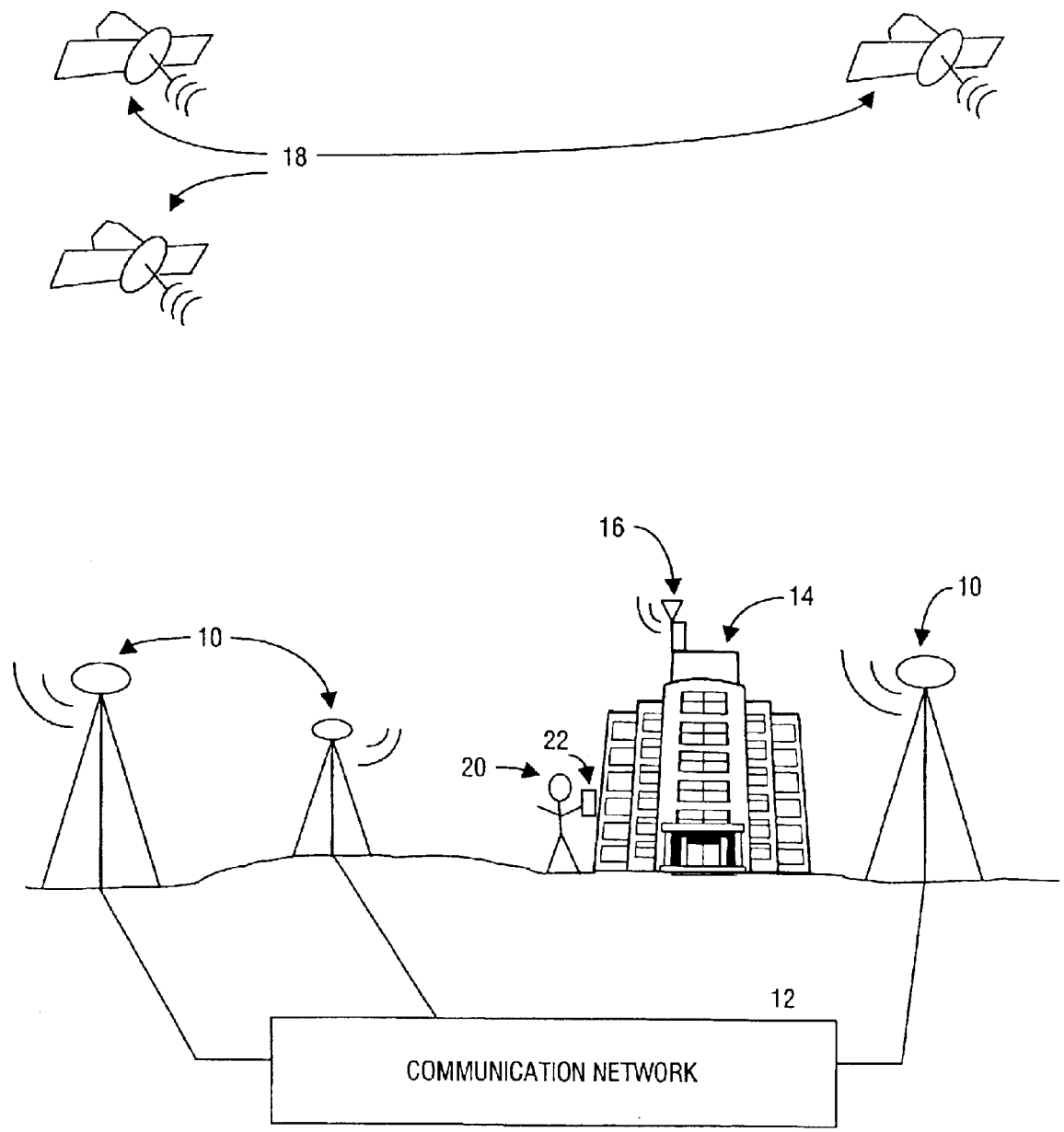
FIG. 1 is a perspective view of a plurality of wireless communications network base stations, a building having a repeater located thereon, GPS satellites, and a user holding a mobile station.

This invention is described in the following description with reference to the Figures, in which like numbers represent the same or similar elements.

Glossary of Terms and Acronyms

The following terms and acronyms are used throughout the detailed description:

AFLT Advanced Forward Link Trilateration. A location technique that utilizes the mobile station's measured time-of-arrival of radio signals from base stations (and optionally other terrestrial measurements).

AFLT Searcher A part of the mobile station that conducts searches for the pilot signals from each base station that may be in view.

A-GPS Assisted Global Positioning System. A location technology based on GPS pseudo-range measurements, but utilizing AFLT or similar BTS based position location technology to assist in determining position.

Base Station A unit that communicates with a mobile station, for example a base station may include Base Transceiver Station (BTS), Mobile Switching Center (MSC), Mobile Positioning Center (MPC), Position Determination Entity (PDE) and any Interworking Function (IWF) required for network connection.

BPSK Binary Phase Shift Keying.

BTS Base Transceiver Station. A fixed station used for communicating with mobile stations that includes antennas for transmitting and receiving wireless communication signals.

C/A codes Coarse/Acquisition codes. Periodic sequences transmitted by GPS satellites, used to identify the transmitting GPS satellite and measure pseudo-range from the observed GPS satellite to a GPS receiver.

CDMA Code Division Multiple Access. A high-capacity digital wireless technology.

CSM Cell Site Modem. Chipsets for wireless base-station equipment.

FL Forward Link. The transmission from a base station (BTS) to a mobile station (MS).

FTL Frequency Tracking Loop. The FTL tracks the carrier frequency of a received communication signal to enable accurate demodulation.

GPS Global Positioning System. A technique utilizing distance measurements to GPS satellites to determine three-dimensional location.

GSM Global System for Mobile Communications.

MS Mobile Station. The term used to describe a subscriber's handset or wireless terminal.

MSM Mobile Station Modem.

PCS Personal Communications Services. All digital cellular transmission that operates in the 1.8–2.0 GHz range.

PDE Position Determining Entity. The network entity that manages the position determination of a mobile station Pilot Set (active) Pilot signals associated with Forward Traffic Channels currently assigned to the mobile station. These are the strongest pilot signals received by a mobile station from local base stations and are typically multipaths of the same pilot signal.

Pilot Set All pilot signals that can be seen by a mobile station whose (candidate) strength as measured by the mobile station exceeds an "over-the-air" given threshold.

Pilot Set All pilot signals transmitted by base stations in the vicinity of (neighbor) the base station currently transmitting to a mobile station, such that they may be received by the mobile station.

Pilot Signals Radio signals received from local base stations that identify the base station.

PN codes Pseudo-random Noise codes. Certain sequences transmitted by BTS's used as identifiers for a cell (or a cell sector), for spreading, and to scramble voice and data transmissions. PN codes are also used to determine pseudo-range from the observed BTS to mobile station.

PPM Pilot Phase Measurement. Measurements of pilot signals obtained from an AFLT search, including a measurement of PN code shift.

PRM Pseudo-range Measurement. Measurements of GPS satellite signals from a GPS satellite search, including a measurement of a C/A code shift.

QPSK Quadrature Phase Shift Keying.

Repeater A device that receives, amplifies, and retransmits a radio signal to and from a BTS.

RL Reverse Link. The transmission from a mobile station (MS) to a base station (BTS).

RMSE Root Mean Squared Error. RMSE estimate provides uncertainty of measurement based on the strength of the path used to report pilot phase.

SNR Signal-to-Noise Ratio.

TRK_LO_ADJ A signal that controls a voltage-controlled, temperature-compensated crystal oscillator (VCTCXO) in the mobile station. Typically, all clocks and frequency references in the mobile station are generated from this oscillator.

Table of Variables

The following variables are used throughout the detailed description:

f The frequency of the modulation waveform in Hz.

$f_A$ The amplitude (magnitude) of the modulation waveform in Hz.

$f_C$ CDMA chip frequency (=1.2288 MHz)

n Total number of bits used for encoding the repeater ID.

N Total number of possible repeater IDs that may be obtained using a particular watermark scheme.

$N_{POST}$ The number of times coherent accumulation is performed on the output of complex rotation in frequency correlation.

$N_{PRE}$ The number of pilot signal samples from the AFLT searcher to be coherently accumulated.

T Half period of the modulation waveform in CDMA chips.

$T_C$ CDMA chip period ($=1/f_c$).

$T_{CPD}$ The cross product update rate in CDMA chips.

$T_{FC}$ Time to perform a frequency correlation algorithm as a background task in firmware.

$T_{MAX}$ Longest modulation waveform half-period in CDMA chips.

$T_{MIN}$ Shortest modulation waveform half-period in CDMA chips.

Environment

FIG. 1 is a perspective view of a plurality of base transceiver stations (BTS's) 10, a building 14 having a repeater 16 located thereon, GPS satellites 18, and a user 20 holding a mobile station 22.

The BTS's 10 comprise any collection of base stations utilized as part of a wireless communication network for connection with a mobile station. The BTS's typically provide communication services that allow a mobile station such as wireless phone to connect to another phone over a wireless communication network 12; however, BTS's could also be utilized with other devices and/or for other wireless communication purposes such as an Internet connection with a handheld personal digital assistant (PDA).

In one embodiment, the BTS's 10 are part of a CDMA wireless communication network; however in other embodiments other types of wireless communication networks, such as GSM networks, may be used. In this embodiment, each of the BTS's periodically emits a pseudo-random sequence that uniquely identifies the BTS. The pseudo-random sequence is a series of bits that are useful for the receiver to lock upon. In CDMA terminology this pseudo-random sequence is termed a "pilot signal"; as used herein, the term pilot signal can apply to any wireless communication system as well as to CDMA systems.

A repeater 16 in its basic form comprises an amplifier, and receives and retransmits amplified pilot signals between a BTS and a mobile station. Repeaters may be situated strategically throughout the cellular network where gaps, interference, and weak service are otherwise found, to enhance signal to noise ratios by amplifying pilot signals from the BTS's to additional coverage areas.

The GPS satellites 18 comprise any group of satellites used for position location determination of a GPS receiver. The satellites continuously send out radio signals that the GPS receiver can detect, and the GPS receiver measures the amount of time it takes for the radio signal to travel from the satellite to the receiver, by correlating the local replica of GPS satellite C/A code and shifting it in time until it achieves correlation with the received satellite C/A code. Since the speed at which the radio signals travel is known, and the satellites are synchronized to periodically emit their signal every millisecond coincident with "GPS time", it is possible to determine how far the signals have traveled by determining how long it took for them to arrive. To a user situated in open space, the GPS receiver typically has an unobstructed view of the satellites; thus, when the user is in open space, measuring the time-of-arrival of the GPS signal is straightforward because it is typically a straight "line of sight" from the satellite to the receiver. However, in the wireless communication context, a user may be situated in a city with buildings or other obstacles that may make GPS positioning more difficult.

Figure 2:
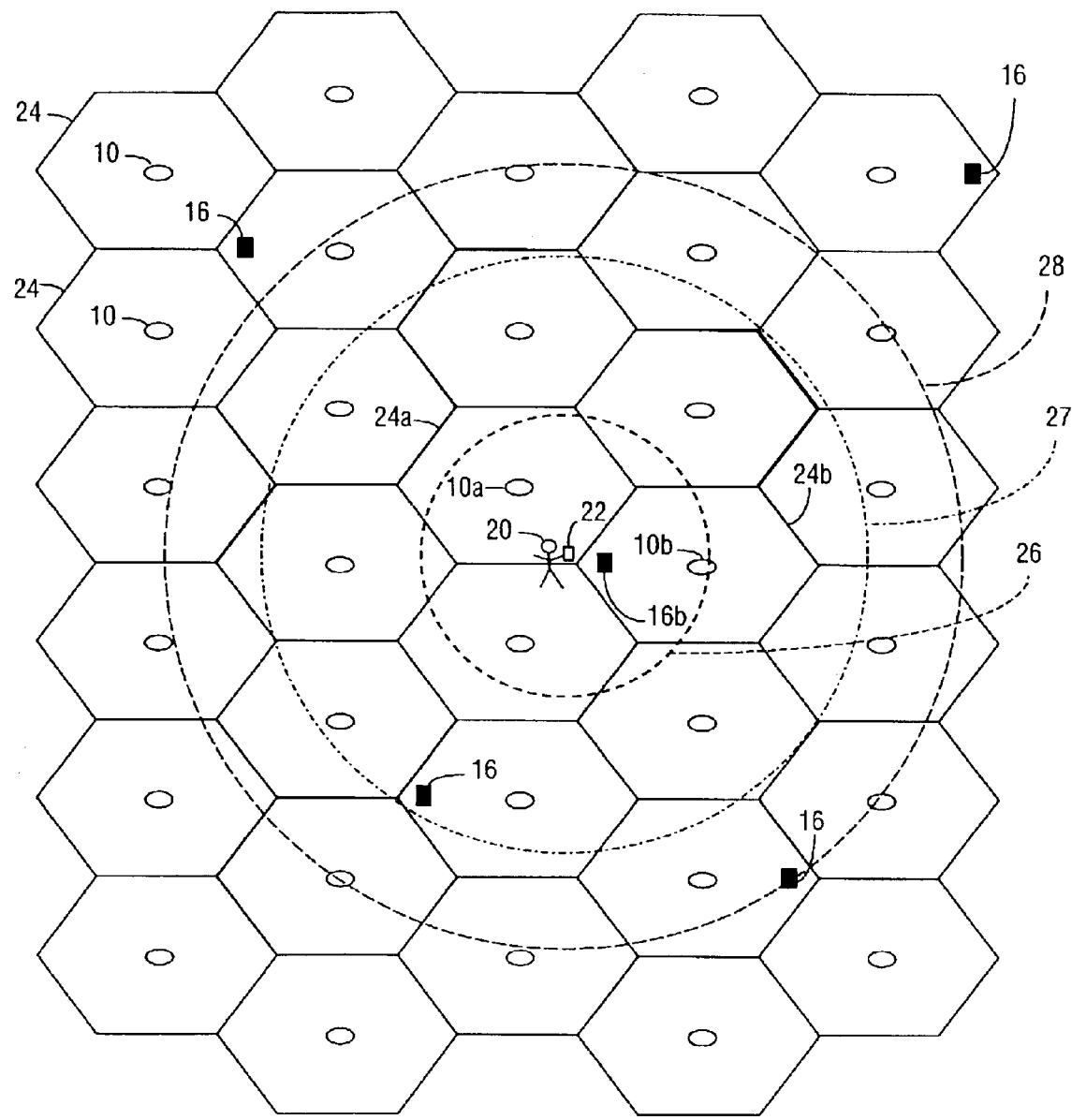
FIG. 2 is an illustration of an exemplary cellular base station coverage area structure.

FIG. 2 illustrates an exemplary cellular BTS coverage area structure. In such an exemplary structure, a plurality of hexagonal BTS coverage areas 24 abut one another in a symmetrically tiled arrangement. The BTS's 10 are located respectively within each of the BTS coverage areas 24 and provide coverage within the area in which they are located. Particularly, for purposeus of description herein, a BTS 10a provides coverage within a coverage area 24a, a BTS 10b provides coverage within a coverage area 24b, and so forth.

In an ideal cellular communication network, coverage areas 24 are configured adjacent to each other to provide continuous cellular coverage to a mobile station as it travels through the various coverage areas. However, most cellular networks have gaps, interference, and other obstacles that cause problems with cellular coverage. For example, environments like tunnels, garages, and sports arenas create problems for cellular services. As other examples, extended highway and rural coverage can be very expensive to maintain with BTS's. Thus, one or more repeaters 16 may be placed within a coverage area in order to enhance or extend the coverage of a BTS at a much lower cost than installing another BTS.

In one embodiment, repeaters 16 comprise antennas and transceivers that send and receive signals to and from mobile stations and BTS's, such as will be described in more detail with reference to FIG. 3. In one simple example, a repeater amplifies the received signals and retransmits them on the same frequency.

In FIG. 2, the user 20 holding the mobile station 22 is located within the first coverage area 24a. The mobile station 22 may be unable to receive a sufficiently strong pilot signal from a first BTS 10a due to interference from an obstacle such as a large building (not shown). Additionally, the mobile station 22 may be unable to receive a sufficiently strong pilot signal directly from the second BTS 10b due to the relatively far distance. However, a repeater 16b is placed appropriately within coverage area 24b, such that the location of the mobile station 22, which would otherwise experience a gap in service, may be sufficiently covered. In other words, when a pilot signal is transmitted from the second BTS 10b, it will be amplified through the repeater 16b and received at the mobile station 22.

The mobile station 22 has position location capabilities such as described above, including AFLT, and therefore can utilize not only the pilot signals currently assigned to the mobile station (i.e., active set), but can also utilize pilots signals beyond the active set for purposes of determining the position of the mobile station. For example, in one embodiment, the mobile station searches for pilot signals present in a neighbor list 29, which is a list of pilot signals that might be receivable by the mobile station. The neighbor list may be supplied from a base station, for example.

It may be noted that certain pilots in the neighbor list may be selected for the candidate set 28 (i.e., pilot signals that can be seen by a mobile station whose strength as measured by the mobile station exceeds an "over-the-air" given threshold) or the active set 27 (i.e., pilot signals associated with Forward Traffic Channels currently assigned to the mobile station, which are the strongest pilot signals received by a mobile station from local base stations and are typically multipaths of the same pilot signal) according to current CDMA standards.

In order to use AFLT measurements in position location determination of the mobile station 22, the pilot signals (whether in the active, candidate or neighbor set) must be successfully screened for repeaters, and if repeated, the mobile station must determine from which repeater the signal came; additionally, the location and internal delays of the repeaters must also be known and available in order to use repeated AFLT measurements in the position location calculation.

As previously described herein, conventional AFLT and A-GPS positioning systems within the mobile station do not detect and/or identify a repeated signal, which makes the pilot phase measurements for determining position substantially useless in an area having repeater coverage. To address this problem, a repeater that is able to uniquely watermark a forward link signal, and a mobile station that is able to detect and identify a watermarked repeated signal are disclosed herein. Because the mobile station is able to detect and identify whether or not a signal is repeated, and if repeated, from which repeater the signal came, accurate position information may be determined using any of the active, candidate, and neighbor pilot signals received by the mobile station. In addition, a repeater that is able to (uniquely or non-uniquely) watermark a forward link signal, and a mobile station that is able only to detect watermarked repeated signals, are disclosed herein. In this embodiment, because the mobile station is able to only detect whether or not a signal is repeated, all the repeated pilot signals (and the pilot signals that were not successfully repeater-screened) must be excluded from the position location determination.

Descriptiom

Forward Link Repeater Frequency Watermarking (FLRFWM) System

Figure 3:
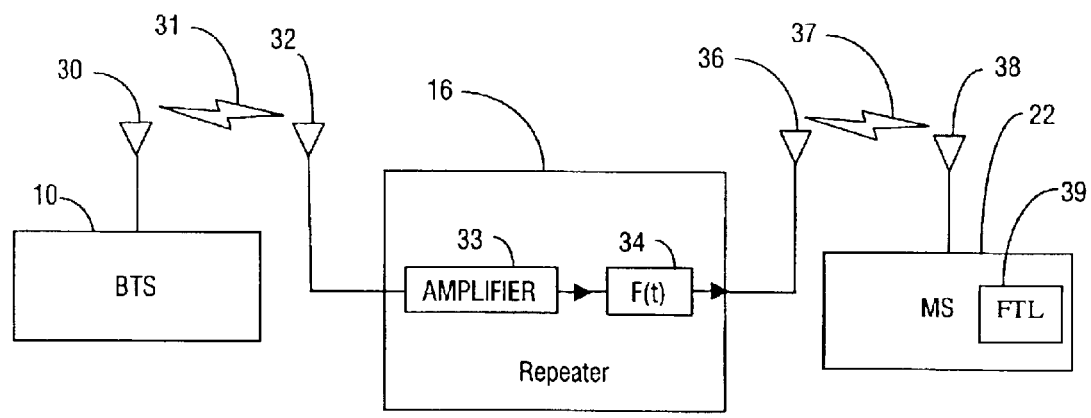
FIG. 3 is a block diagram of a forward link repeater frequency watermarking (FLRFWM) system including a base transceiver station (BTS), a repeater, and a mobile station (MS)

FIG. 3 is a block diagram of a communication system that implements an FLRFWM system. The communication system includes a base transceiver station (BTS) 10, a repeater 16, and a mobile station (MS) 22. The BTS 10 has an antenna 30 for transmitting a forward link pilot signal 31 therefrom. The repeater 16 has a first antenna 32 for receiving the forward link signal 31 from the BTS 10, an amplifier 33 for amplifying the signal, a fast frequency modulator 34 for watermarking the FL signal, and a second antenna 36 for transmitting the watermarked forward link signal 37 to the MS 22. The MS has an antenna 38 for receiving the watermarked forward link signal 37 from the repeater, and a frequency tracking loop 39 to enable accurate demodulation of the FL signal 37.

The BTS 10 may comprise any appropriate base station used for wireless communication. In one embodiment, the BTS is configured for a CDMA network; however, in other embodiments, the BTS may be implemented for other wireless communication networks, such as TDMA and GSM. Although only one antenna 30 for transmitting signals is shown, it should be understood that the BTS has a typical configuration of a BTS, including one or more transceivers and antennas for transmitting and receiving signals.

The repeater 16 comprises any appropriate repeater that has an amplifier 33 for amplifying telecommunication signals; that is, the repeater 16 comprises any suitable configuration that receives, amplifies, and retransmits telecommunication signals to and from the BTS 10 and the MS 22. Additionally, the repeater comprises a frequency modulator 34 that watermarks the forward link signal 31 with a fast frequency modulation as will be discussed in more detail with reference to FIG. 4 or FIG. 5, for example.

In one embodiment, the repeater 16 comprises first and second antennas 32, 36. The first antenna 32 is used to receive the forward link signal 31 and the second antenna 36 is used to retransmit the forward link signal 37 out of the repeater. It may be noted that although the repeater in FIG. 3 shows only an amplifier and a frequency modulator, it should be understood that the repeater 16 has any suitable configuration; for example, the repeater may also comprise transceivers (transmitters/receivers) that function to receive and retransmit signals into and out of the repeater 16 via the antennas 32, 36.

It may be noted that the repeater may comprise alternative configurations; for example, the repeater may be connected to the BTS via a wired connection. One such example includes an optical repeater that receives an optical signal (e.g., fiber optic), amplifies it (and/or reshapes, retimes, frequency shifts, and otherwise reconstructs it), and retransmits it wirelessly (on the same or different frequency).

The repeater 16 includes the fast frequency modulator 34 that frequency modulates the forward link signal 31 with a fast frequency watermark, such as described in more detail with reference to FIG. 4 or FIG. 5, for example. The fast frequency watermark identifies the forward link signal as a repeated signal and may identify a unique repeater ID that indicates through which repeater the signal passed. By watermarking the repeated forward link signal, it can be determined which of the pilots are repeated, and by uniquely watermarking the repeated forward signal in addition it can be determined for those repeated pilots, which particular repeater repeated the pilot signal. Using this information, accurate position location information may be obtained using AFLT or other similar position location technology.

Still referring to FIG. 3, the mobile station 22 has an antenna 38 for receiving telecommunication signals from the BTS's and repeaters, including the watermarked forward link signal 37 from the repeater 16. As will be described in more detail with reference to FIG. 7 and FIG. 8, the MS 22 can detect the fast frequency watermark on a FL signal, if any, distinguish whether the signal came from a repeater, and in some embodiments identify which particular repeater transmitted the signal, thus enabling accurate AFLT measurements to be achieved and enabling them to be used in position location calculation as will be described elsewhere herein. It should also be noted that the frequency tracking loop 39 should not be able to detect the fast frequency watermark, such as will be described in more detail with reference to FIGS. 4 and 6.

Repeater Frequency Watermarking Modulation Scheme

Figure 4:
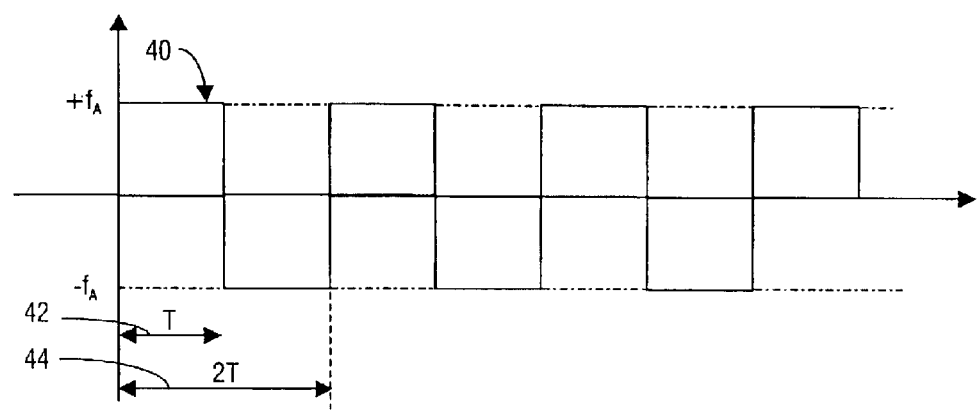
FIG. 4 is a graph that shows one example of a modulation waveform F(t) applied by the frequency modulator (FIG. 3) to watermark the FL signal.
Figure 5:
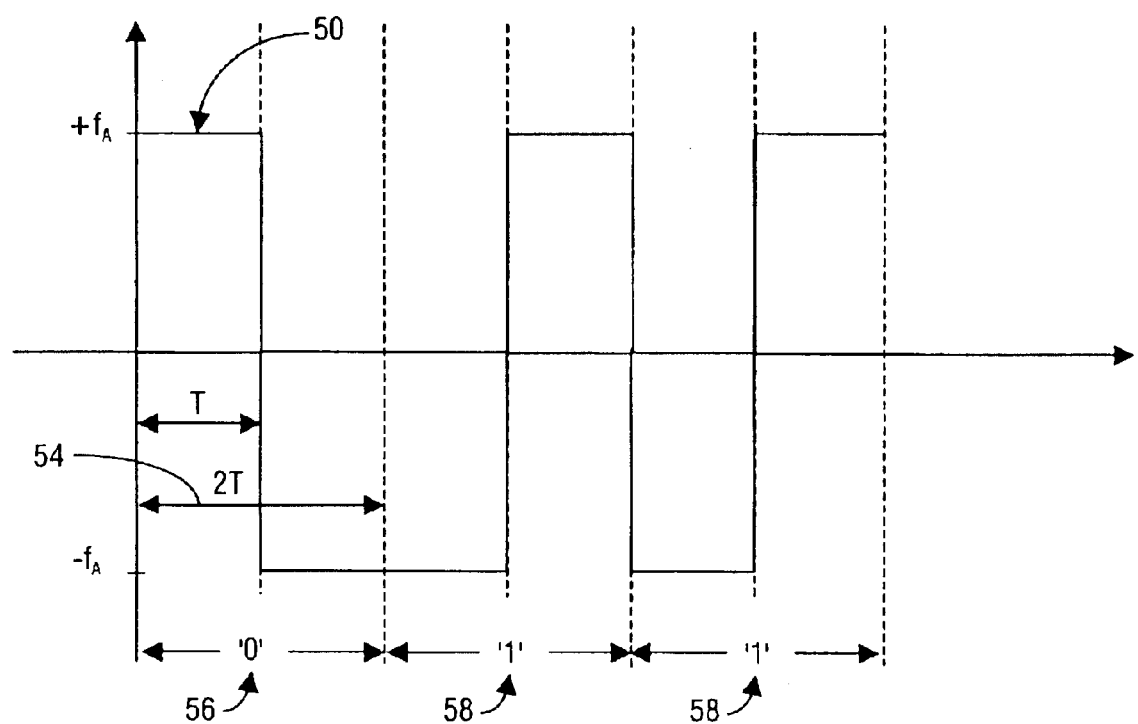
FIG. 5 is a graph that shows another example of a modulation waveform F(t), which comprises a BPSK waveform.

Reference is now made to FIGS. 4 and 5, which illustrate two example fast frequency modulation waveforms that may be used to watermark the FL signal. FIG. 4 illustrates a periodic square wave waveform used to frequency modulate the FL signal, wherein the repeater ID unique for each repeater is identified by the frequency (i.e., the choice of the half period T) of the modulation waveform, such as will be described herein. FIG. 5 illustrates a non-periodic waveform used to frequency modulate the FL signal wherein the repeater ID unique for each repeater is encoded within the modulation waveform using binary phase shift keying (BPSK). It should be noted that a variety of different modulation waveforms may be frequency modulated onto the FL signal in order to watermark the FL signal. For example, periodic waveforms such as sine and triangle type waveforms, and non-periodic waveforms such as QPSK and OQPSK may be used.

In some embodiments where detection only of a repeated signal is required, the mobile station may simply detect whether the signal is repeated or not, without identifying the repeater through which the signal passed. In this case, since the presence of the modulation waveform simply indicates that the pilot signal is repeated, and no additional information is necessary, all the repeaters could be assigned the same ID and thus apply the same modulation waveform to all repeated FL signal. However in other embodiments where both detection and identification of a repeated signal are required, the modulation waveform includes a repeater ID unique to each repeater such that the mobile station may be able to not only detect the presence of the modulation waveform but also identify the repeater through which the pilot signal passed from the modulation waveform.

FIG. 4 shows one example of a modulation waveform 40 that may be modulated onto the FL signal as it goes through the repeater to watermark the signal in one embodiment. In this embodiment, the frequency of the modulation waveform is the unique ID of the repeater that repeated the FL signal; that is, the half period T of the waveform represents repeater ID of the repeater through which the FL signal passed. In this embodiment, the modulation waveform comprises a periodic square wave 40 with amplitude of $f_A$ and a period 44 of 2T. Variables $f_A$ (amplitude of the frequency modulation waveform) and T (half period of the waveform) 42 should be chosen to minimize the adverse effect on FL, AFLT, and GPS performance while maximizing repeater detection and identification probabilities, as will be described elsewhere in more detail.

In order to watermark n-bits (where n represents the number of bits used for the repeater ID) onto the pilot signal, $N=2^n$ waveforms may be defined, each with a period of $2[T_{MIN}:inc:T_{MAX}]T_C$ seconds, where $2T_{MIN}$ is the shortest, and $2T_{MAX}$ is the longest modulation waveform period in CDMA chips, N is the number of distinct repeater ID's that may be modulated in this example embodiment, and inc is chosen to create a uniform frequency spacing between N watermarks.

Additionally, the half period T 42 should be chosen such that the slowest watermark (i.e. watermark with a maximum T ($T_{MAX}$)) is sufficiently fast to substantially avoid detection by the frequency tracking loop (FTL) (shown in FIG. 3 at 39), at the MS. Otherwise, if the FTL were able to detect the frequency watermark at the MS, it would cause TRK_LO_ADJ (a signal that controls voltage-controlled, temperature-compensated crystal oscillator VCTCXO in the mobile station from which all the mobile clocks and frequency references may be generated) to be off by the current amplitude of the frequency watermark ($f_A$ or $-f_A$). In a CDMA network system, this would result in undesired CDMA code Doppler that would adversely impact accuracy of AFLT measurements because there is conventionally no time tracking implemented in AFLT searching; similar problems may result when implemented in other wireless communication systems as well. Furthermore, in A-GPS systems, the frequency tracking loops are disabled during GPS processing since the mobile is always in an acquisition mode and TRK_LO_ADJ is frozen at its last CDMA value, which would be the opposite of the watermark amplitude at the moment of freezing. This error translates into GPS Doppler error in GPS pseudo-range measurements, potentially reducing the measurement yield of GPS pseudo-range measurements and the accuracy of the resulting position location.

In some implementations, it may be advantageous to choose a waveform with a magnitude $f_A$ of up to about 50 Hz in order to minimize degradation of FL performance (e.g. less than 0.2 dB on average), maximize repeater detection and identification probabilities, and minimize time-to-identify. In one example implementation of the waveform of FIG. 4 wherein fast frequency modulation is implemented in a CDMA network system, good results are found when $f_A$ is about 50 Hz and T is in about [10*64:inc:11*64] CDMA chip range, where CDMA chip duration or $T_C$ is $1/1.2288e6$ seconds, and inc is chosen to achieve uniform spacing in frequency for easier detection. The resulting value is then truncated to the nearest chip×8 clock. For example, the resulting frequencies of the watermark waveform would be in the [872.72:960] Hz range with uniform (about 2.815 Hz) separation. These results will be described in more detail in the Example section, which discusses how variables (e.g., $f_A$ and T) can be optimized to provide minimal impact on FL CDMA, AFLT and GPS performance, maximum repeater detection and identification probability, and minimal time-to-identify.

The fast frequency modulation in the embodiment of FIG. 4 is advantageous in part because it does not require symbol time synchronization. In other words, because the repeater is uniquely identified by the frequency of the periodic modulation waveform (i.e., by the half period T), rather than by a particular (n-bit) symbol code, there is no need to provide synchronization at the repeater that would otherwise be required to accurately synchronize the start (and end) of a non-periodic modulation waveform (e.g., encoded n-bit symbol code). Additionally, because of the inherent characteristics of the periodic modulation waveform in this embodiment, specifically the repeater ID being encoded in the modulation waveform frequency, this watermark is highly immune to fading as compared to other frequency modulation based watermark schemes.

Reference is now made to FIG. 5, which illustrates another example modulation waveform 50 used to watermark the FL. Particularly, FIG. 5 illustrates using Binary Phase Shift Keying (BPSK) to fast frequency modulate an n-bit repeater ID on a FL signal. In this embodiment, each bit duration 54 is defined by two half periods T. A zero ('0') 56 is generated by modulating the pilot signal for a half period T with $f_A$, followed by modulating the signal with $-f_A$ for a half period T. A one ('1') 58 is generated by modulating the FL signal first with $-f_A$ and then with $f_A$ for two consecutive time T durations. This watermarking modulation will require (n-bit) symbol time synchronization, and therefore the repeater must have a system to accomplish the necessary synchronization. Even though symbol time synchronization can add complexity and cost to the implementation of the fast frequency modulation at the repeater, in some embodiments, the benefits may outweigh the costs, and the modulation scheme can achieve good results.

It may be noted that while some examples of implementation in a CDMA system are given here, fast frequency modulation may be implemented in a variety wireless communication systems, such as TDMA and GSM.

Mobile Station

Figure 6:
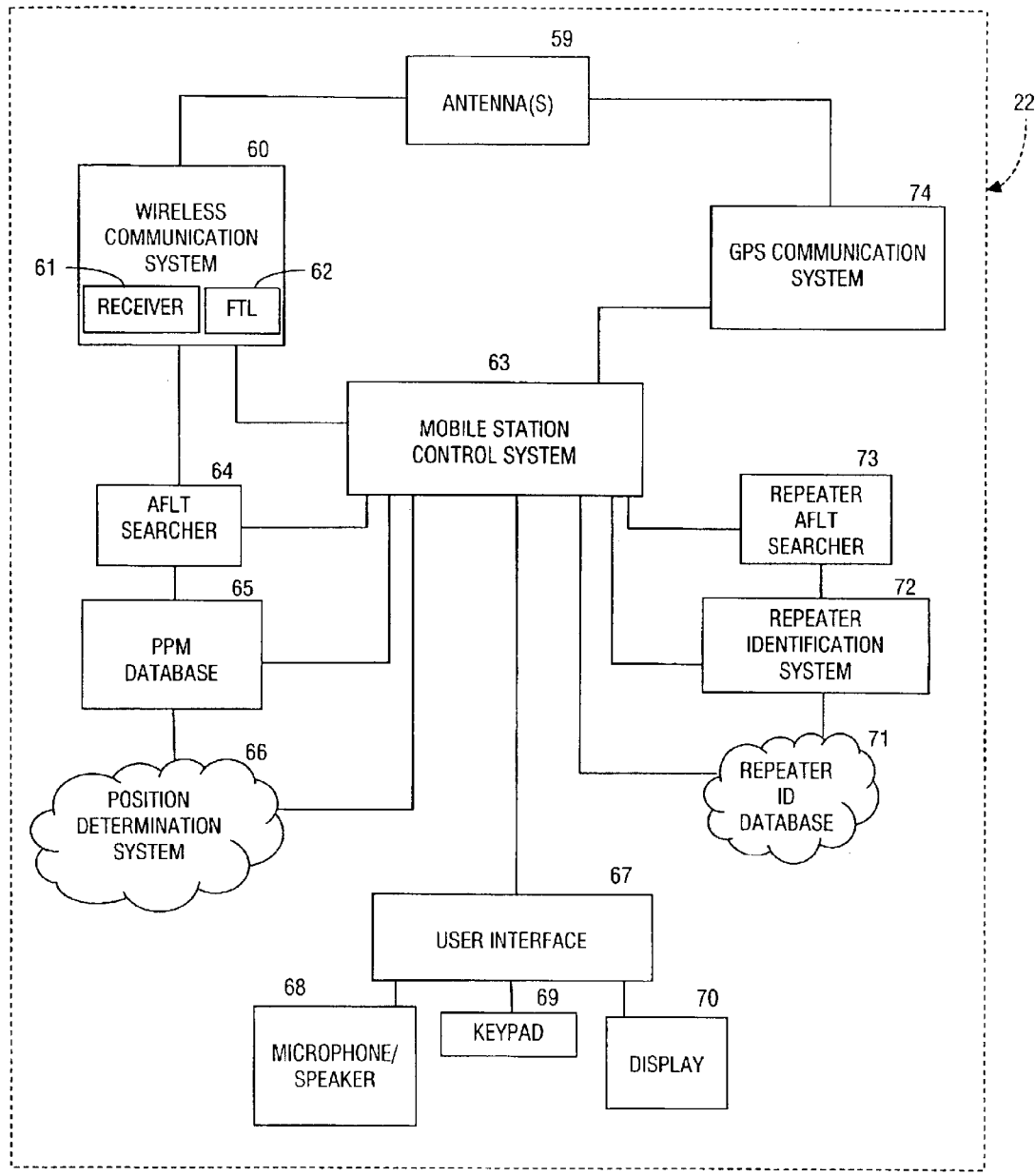
FIG. 6 is a block diagram of one embodiment of a mobile station incorporating wireless communication and position location capabilities, and including a repeater identification system.

FIG. 6 is a block diagram of one embodiment of the mobile station 22 incorporating AFLT and GPS-based position location capabilities, and including a repeater identification system capable of detecting a watermark on a FL signal (i.e. if the signal is repeated). If detected, it can extract repeater information from the watermarked repeated FL signal. This embodiment utilizes both GPS and/or AFLT to determine position; however in alternative embodiments AFLT may be used alone.

In FIG. 6, a wireless communication system 60 is connected to one or more antennas 59. The wireless communication system 60 comprises suitable devices, hardware, and software for communicating with and/or detecting signals from wireless BTS's, including a receiver 61 for receiving FL signals, and a frequency tracking loop (FTL) 62 that enables accurate demodulation of the FL signals.

In one embodiment, the wireless communication system 60 comprises a CDMA communication system suitable for communicating with a CDMA network of wireless BTS's; however in other embodiments, the wireless communication system may comprise another type of network such as TDMA or GSM.

A mobile station control system 63 is connected to the wireless communication system 60, and typically includes a microprocessor that provides standard process functions, as well as other calculation and control systems. An AFLT searcher 64 is connected to the wireless communication system 60 and mobile station control system 63. The AFLT searcher detects pilots and performs pilot phase measurements on the mobile station's found pilot signals (e.g., from the active, candidate, and neighbor pilot sets), and supplies those measurements to pilot phase measurement (PPM) database 65.

The pilot phase measurement (PPM) database 65, which is connected to the control system 63, is provided to store information regarding observed data measurements from the AFLT searcher, for example time-of-arrival, RMSE, and Ec/Io. A pilot ID uniquely identifies each pilot signal in the database.

A position determination system 66, which may be optionally provided within the mobile station, is connected to the mobile station control system 63 and the PPM database 65; the position determination system 66 requests information and operations as appropriate from the other systems (e.g. GPS communication system, PPM database, and repeater identification system), and performs the calculations necessary to determine the mobile station's position using measurements obtained by any suitable AFLT algorithm, GPS algorithm, or a combination of AFLT and GPS algorithms (A-GPS). To that end, the position determination system 66 may also comprise a database (not shown) of locations and internal delays of all BTS's and repeaters whose pilot signals are listed in the active, candidate, and neighbor list.

It should be noted that the position determination system 66 may function alone, without the network position determining entity (PDE); that is, the MS may determine its own position without assistance from a resource outside the MS (standalone mode). Alternatively, the position determination system 66 may function together with the external PDE residing elsewhere in the network; that is, the PDE may assist the MS in generating a GPS search list (e.g., by providing a GPS almanac and ephemeris to the MS), while the MS may perform position calculation (MS-based mode). However, in some alternative embodiments, the mobile station control system 63 may receive GPS acquisition assistance (e.g., a GPS search list with search windows both in code and frequency) from an external PDE and communicate some or all of the position measurement information (e.g., AFLT and GPS measurements, repeater information, and so forth) to a PDE outside the MS, which calculates the position of the MS and possibly sends the position back to the MS through the wireless communication network. The PDE may reside on one or more external processing systems that are networked to communicate with the mobile station. It may be noted that the PDE aiding could be modified to include sending any repeater aiding information to the MS that is available to the serving base station, such as all of the possible repeaters on a particular PN, their repeater IDs, and their internal delays (and potentially their locations, if position location is to be performed at the MS). This may aid in reduction of repeater time-to-identify and thus time-to-fix.

A user interface 67 includes any suitable interface systems, such as a microphone/speaker 68, keypad 69, and display 70 that allow user interaction with the MS. The microphone/speaker 68 provides for voice communication services using the wireless communication system. The keypad 69 comprises any suitable buttons for user input. The display 70 comprises any suitable display, such as a backlit LCD display.

A GPS communication system 74 is also connected to the mobile station control system 63 and to the one or more antennas 61, and comprises any suitable hardware and software for receiving and processing GPS signals.

The mobile station 22 further comprises a repeater AFLT searcher 73, repeater identification system 72, and optional repeater ID database 71, which together enable accurate PPMs for position location determination even in wireless communication coverage areas where repeaters are present. Upon request, the repeater AFLT searcher 73 runs a repeater AFLT search on some or all active, candidate, and neighbor pilots found by the regular AFLT searcher 64. The results are then sent to the repeater identification system 72, which comprises any suitable hardware, firmware and/or software that runs a repeater identification search. The repeater identification search is able to detect a repeated signal, if any, and to decode a watermark on the signal in order to determine from which repeater the FL signal came. Typically the repeater identification search is implemented digitally, such as will be discussed with reference to FIG. 8; however, other implementations could use other search methods.

In some embodiments, a repeater ID database 71, connected to the repeater identification system 72, may be optionally provided and may hold information about repeated signals within the vicinity of the mobile station currently capable of transmitting to the mobile station to aid in detection and position location. The repeater ID database may be useful to assist in identifying a repeater; for example, the information in the repeater ID database may be sent to the position determination system internal in the mobile station or to the network position determining entity, external to the MS, for using the repeated pilot signals in determining the position of the MS. It may be noted that the information stored in the repeater database may optionally be housed external to the MS in the PDE, such as described with reference to the position determination system 66.

Repeater Frequency Watermarking Detection and Identification Scheme

Figure 7:
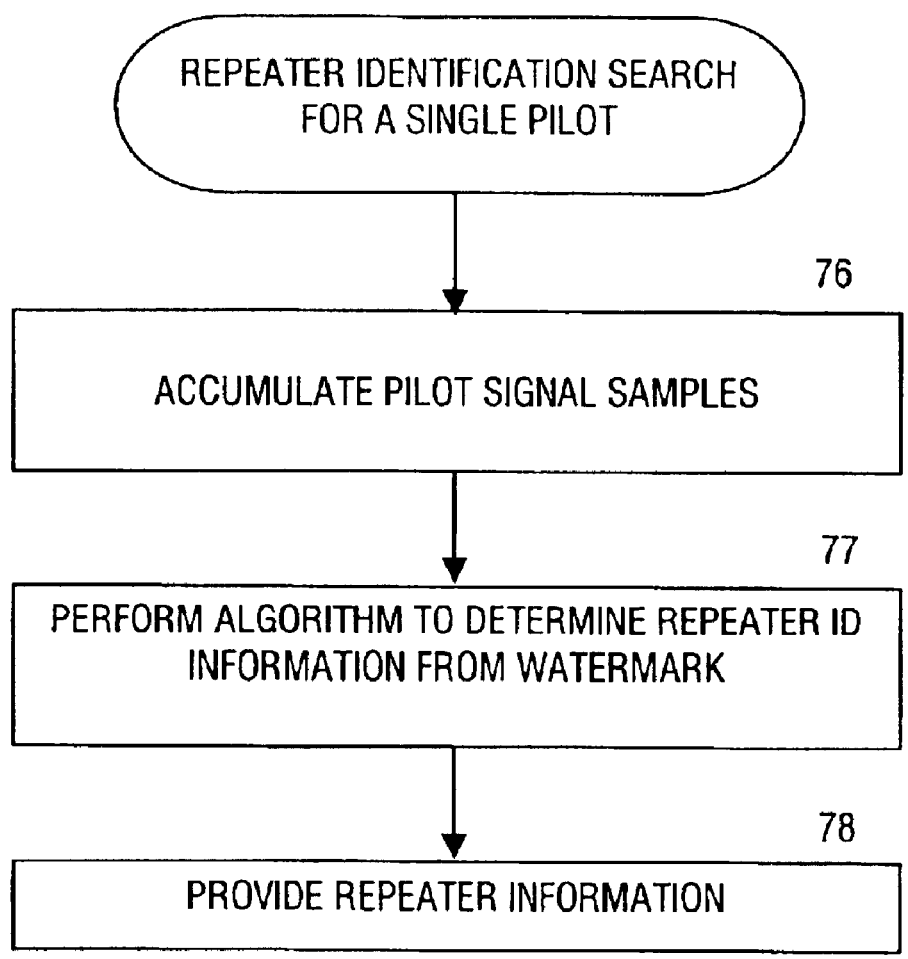
FIG. 7 is a flow chart that illustrates a repeater identification search performed on one pilot.

Reference is now made to FIG. 7, which is a flow chart of a repeater identification search, illustrating how the repeater identification search detects and identifies a watermark on a single FL signal in one embodiment. As will be described with reference to FIGS. 9 and 10, multiple repeater AFLT searches will typically run on multiple pilot signals in order to obtain sufficient repeater-screened AFLT measurements for position location; however FIGS. 7 and 8 will focus on a repeater search as applied to a single FL pilot signal.

At 76, a plurality of pilot signal samples are accumulated (e.g., by a pilot searcher) for a single pilot signal in order to provide required processing gain for the signal and to increase the SNR, thereby enabling reliable repeater detection and identification for pilot signal strengths of interest.

At 77, the repeater identification search detects the fast frequency watermark waveform on the FL signal, if any, and in some embodiments, determines repeater ID from the watermark. One example is described with reference to FIG.

8 at 88, which uses frequency correlation to determine the frequency of the watermark, which determines the repeater ID.

It should be understood that many different methods for detecting and identifying repeater ID from a watermark are possible, for example if the watermark comprises a repeater ID encoded by BPSK fast frequency modulation (FIG. 5), the repeater identification search may no longer use frequency correlation but rather a matched-filter based method and would require symbol time synchronization in the repeater. In one example wherein detection only (not identification) of a repeater is desired, the watermark encoding, and thus the detection thereof, may be simplified.

At 78, the repeater information gathered by the repeater search is sent to the mobile station control system or PDE for appropriate processing. It may be noted in some embodiments where detection only of a repeated signal is provided on the watermark (i.e., non-unique repeater ID), then the repeater identification search will result in repeater information indicating whether or not the signal was successfully repeater-screened (e.g. if the repeater search was not even attempted, or if the repeater search has been attempted but failed, or if the repeater search has been successfully performed), and if so, whether or not the signal is repeated. However, if the repeater ID is provided by the waveform, the repeater information will also include the repeater ID extracted from the watermark waveform for the pilot signals found to be repeated.

As will be described elsewhere with reference to FIGS. 9 and 10, the repeater AFLT searcher may run multiple pilots in series or in parallel in order to obtain sufficient repeater-screened pilot phase measurements (PPMs) to determine the position of the mobile station.

Figure 8:
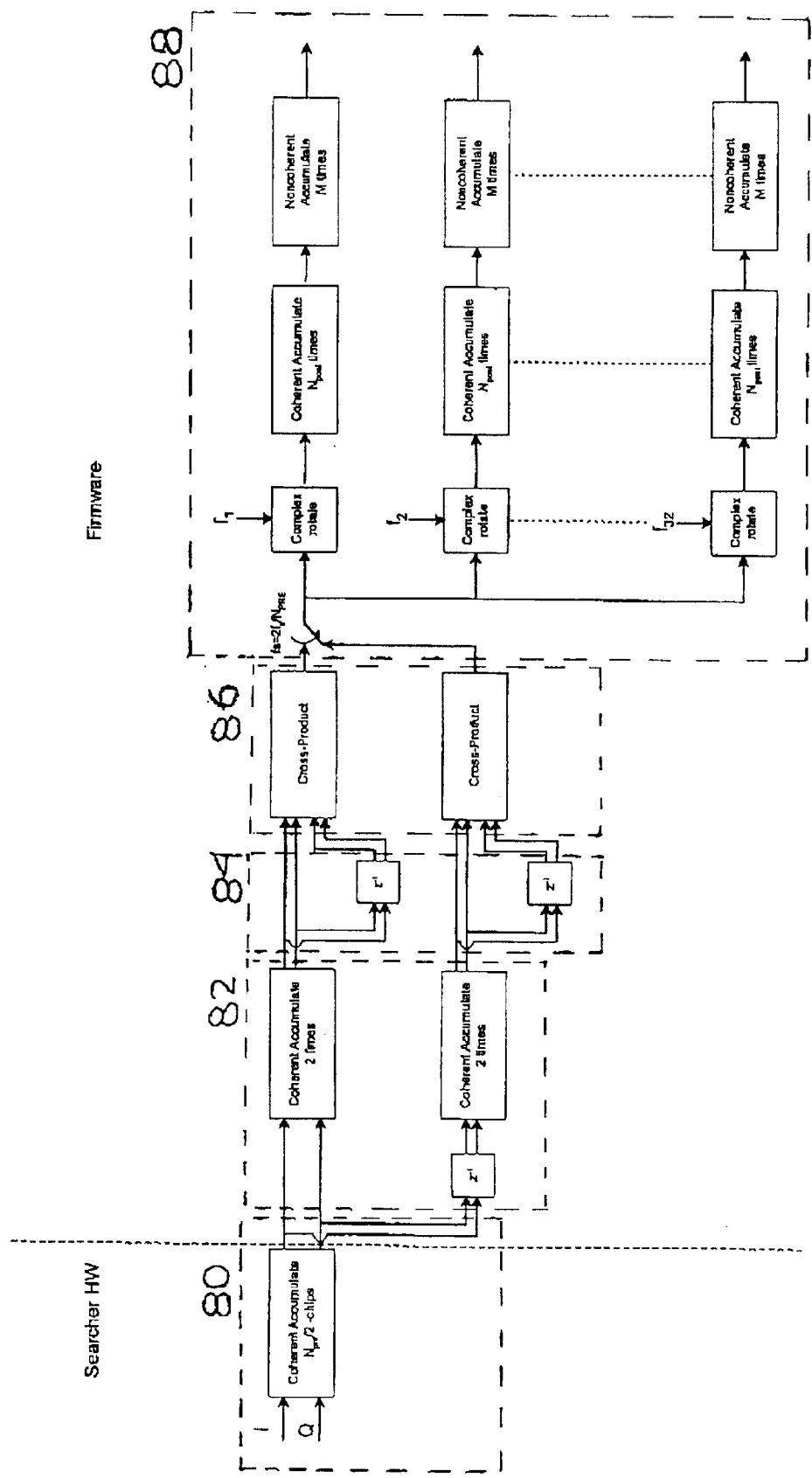
FIG. 8 is a block diagram that illustrates the repeater identification search used to determine the repeater ID from a FL pilot signal in one embodiment.

Reference is now made to FIG. 8, which is a block diagram that illustrates one example embodiment of the repeater identification system, showing how the repeater identification search is configured to examine the forward link signal, and retrieve the watermark frequency that corresponds to the repeater ID using a frequency correlation with all possible repeater IDs. In this example, the repeater ID is contained within the watermark period (2T) and N represents the distinct number of watermarks (repeater ID's) that may be modulated in one example modulation scheme.

At 80, the repeater AFLT searcher receives in-phase (I-phase) and quadrature-phase (Q-phase) pilot signal samples at $f_c$ (chip frequency) and performs coherent accumulation of $N_{PRE}/2$ pilot signal samples to achieve higher processing gain. The output of the coherent accumulation (at 80) includes $N_{PRE}/2$ pilot signal samples now at a slower rate ($f_c/(N_{PRE}/2)$), which have higher SNR. The results, in the form of I- and Q-pilot signal samples, are sent to the repeater identification system, which will be described with reference to reference numerals 82, 84, 86, and 88.

At 82, the repeater identification system receives the $N_{PRE}/2$ CDMA chip pilot signal sample sums from the repeater AFLT searcher 80, and coherently accumulates them two more times. This additional coherent accumulation further increases the SNR and thus the processing gain of the pilot samples.

It may be noted that two sets of coherent accumulation are shown at 82 on over two consecutive on-time, and two consecutive $N_{PRE}/2$-CDMA-chips-delayed $N_{PRE}/2$ chips pilot sample coherent sums (where $z^{-1}$ represents the $N_{PRE}/2$ CDMA chip delay applied to the $N_{PRE}/2$ chip pilot sample sums). This is one example embodiment that may be implemented in order to remove repeater ID detector sampling phase dependency without reducing $N_{PRE}$ from its maximum possible value of $T_{MIN}/2$ (such as described below). In other words, it may be necessary to coherently accumulate these two sets two times (one delayed and one non-delayed), in order to obtain 2 coherent sums over $N_{PRE}$ chips pilot samples that are offset from each other by $N_{PRE}/2$ chips.

At 84, two $N_{PRE}$ chip pilot signal samples coherent sums from 82 are taken (offset by $N_{PRE}/2$ chips), and the same processing is performed on them. Thus, to describe this processing, we can focus only on the processing of the upper on-time $N_{PRE}$ chip sum of pilot samples in 84. Here, $z^{-1}$ illustrates a delay of $N_{PRE}$ CDMA chips applied to delay one the $N_{PRE}$ pilot sample sum output from 82. As will be discussed with reference to 86, one $N_{PRE}$ chips delayed and one non-delayed version of the $N_{PRE}$ pilot signal chip sample sums will provide signals with which to calculate a cross product.

At 86, the repeater identification system receives the $N_{PRE}$ chip delayed and non-delayed $N_{PRE}$ pilot signal sample sums from 84 (for both on-time and $N_{PRE}/2$ chip delayed sums). The watermark is then retrieved by calculating the cross product of the delayed and non-delayed coherent sums of $N_{PRE}$ CDMA chip pilot signal samples from 84 (for both on-time and $N_{PRE}/2$ chip delayed sums). $N_{PRE}$ is limited to no more than $T_{MIN}/2$ (which is twice the Nyquist rate), where $T_{MIN}$ is the minimum value of T, due to cross-product practical pull-in range of ($f_C/4T_{CPD}$), where $T_{CPD}$ is the cross-product update rate in CDMA chips (and is equal to $N_{PRE}$ CDMA chips).

It may be noted that FIG. 8 at 86, two sets of cross-products are shown in parallel on $N_{PRE}$ coherent sums that are offset by $N_{PRE}/2$ chips, which follows the two sets of coherent accumulation for the reasons described above. The output of these two cross products would then be time multiplexed, or aligned, by a switch at $f_s=2f_c/N_{PRE}$ to retrieve the combined frequency watermark (e.g., sampled at 2 $f_C/N_{PRE}$, where $f_C$ is CDMA chip frequency and is equal to 1.2288 MHz).

At 88, the repeater identification system receives the fast frequency watermark, if any, from 86 and performs frequency correlation with all possible repeater IDs to extract the repeater ID therefrom. The frequency correlator in essence, obtains the frequency content of the frequency watermark waveform, if any, which in turn identifies the repeater ID in one embodiment.

As shown in at 88, the frequency correlator runs N complex rotations with N possible watermark waveform frequencies, together with coherent accumulation over $N_{POST}$ consecutive complex rotation outputs followed by M non-coherent accumulations to achieve forward link repeater frequency watermark (FLRFWM) detection and identification. In other words, of the N resulting energies, the highest energy that is also stronger than a set threshold is selected as the winning peak, and the frequency used to run complex rotation for this winning peak defines the repeater watermark waveform frequency (1/(2T)). Therefore its number (1 to N) defines the repeater ID. If no energy of the N resulting energies satisfies the winning peak criteria (e.g. the energies are all below the set threshold), then no watermark waveform is present on the FL signal, thus the FL signal is not repeated. In one example embodiment, frequency correlation comprises an N-point FFT (fast Fourier transform) algorithm. It should be noted that performing an N-point FFT algorithm (e.g., 32-point FFT in this embodiment) is advantageous over performing the full $N_{POST}$ FFT (e.g., 2*1364 points here) since it reduces the time needed to perform FFT and thus the time-to-identify. N-point FFT is sufficient because the watermark can only have N distinct frequencies, thus occupying only a small portion of whole frequency space. It may be noted that this is only one example algorithm that may be used to extract repeater ID in one embodiment where the repeater ID is contained in the watermark waveform period (2T) and a total number N of possible unique repeater ID's may be provided per pilot signal (e.g., the waveform of FIG. 4). However, it should be understood that alternative embodiments may utilize other algorithms to extract repeater information from this example watermark waveform or other watermark waveforms.

Repeater AFLT Search Methods

Figure 9:
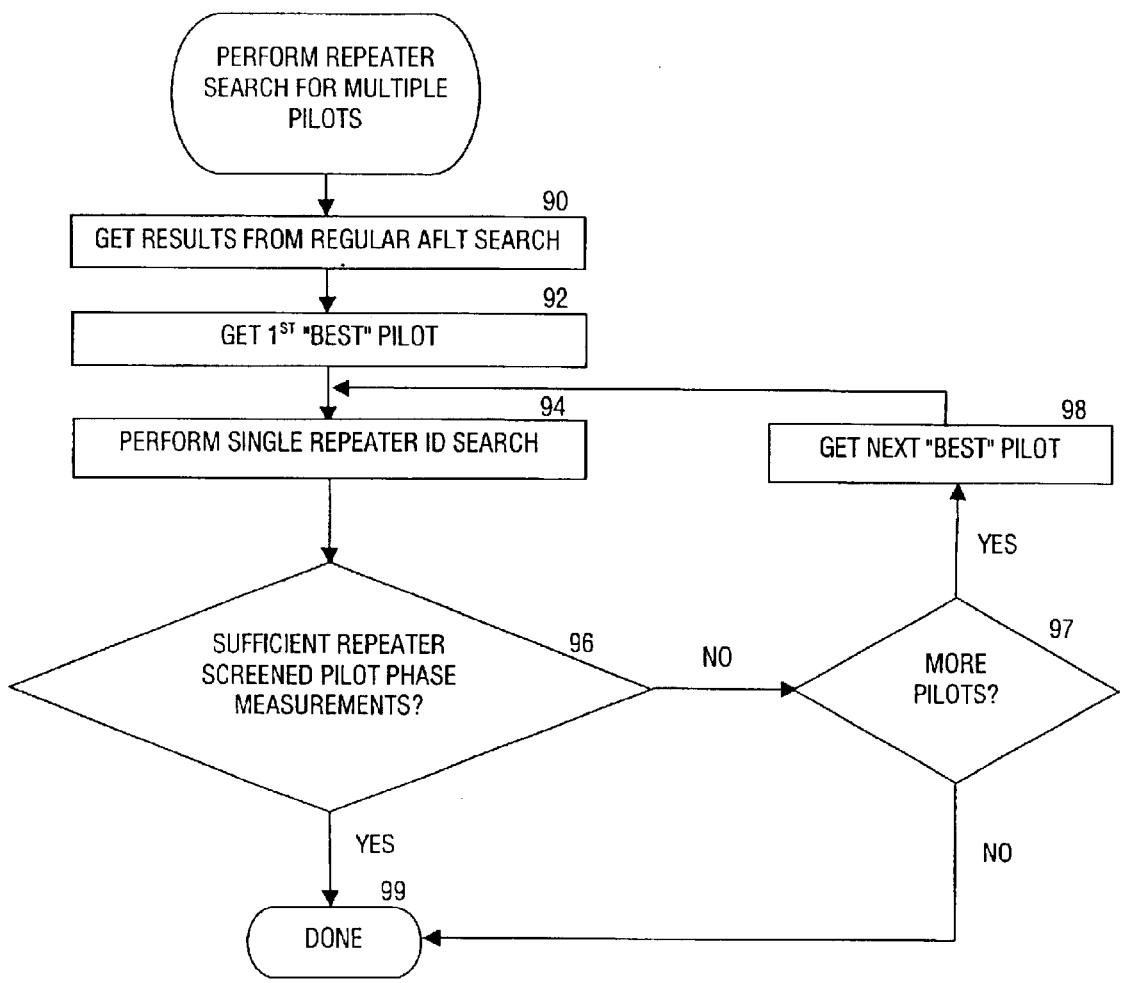
FIG. 9 is a flow chart that illustrates a repeater AFLT search performed on multiple FL pilot signals in one embodiment.
Figure 10:
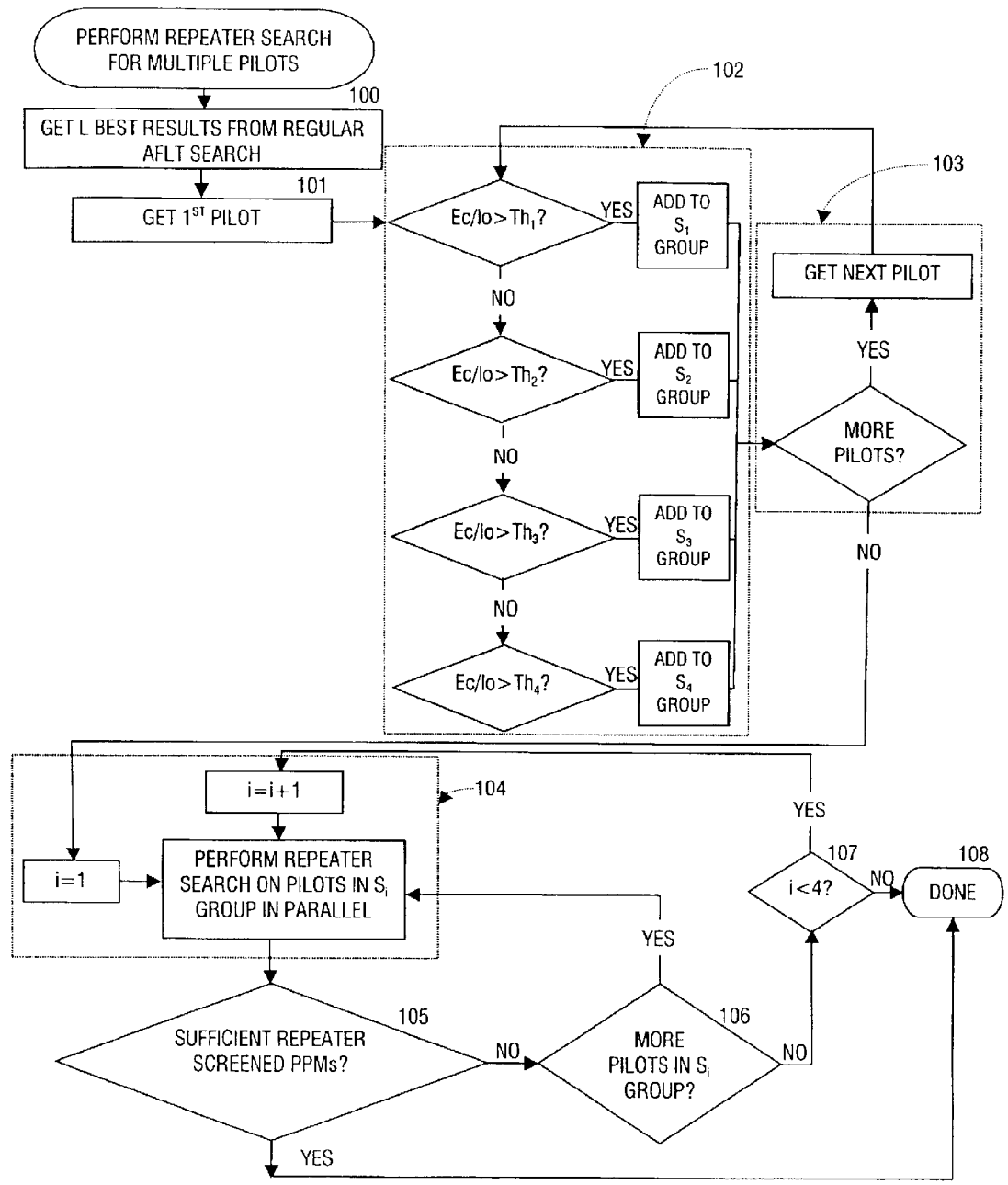
FIG. 10 is a flow chart that illustrates a repeater AFLT search performed on multiple FL pilot signals in another embodiment, optimized for minimal time-to-identify.

FIGS. 9 and 10 are flowcharts that illustrate two alternative example methods for performing repeater searches on multiple pilots to obtain sufficient repeater-screened pilot phase measurements (PPM) for determining the position of the mobile station. It may be noted that there are many possible repeater search methods; however only two methods are illustrated herein. For example, in an A-GPS system, it may be determined that only one or two additional PPMs may be necessary to determine position location (in combination with PRM measurements from GPS); therefore the repeater search may require a much simpler methodology that examines only the one or two best pilot signals.

It may be noted that while FIGS. 7 and 8 illustrate how a mobile station extracts repeater information from a single pilot signal, FIGS. 9 and 10 illustrate repeater AFLT search and identification methods, which include selecting pilot signals, running a repeater identification on each pilot signal and repeating the process until sufficient measurements have been obtained for a pre-fix and/or for determining the final position of the mobile station.

Reference is now made to FIG. 9, which is a flow chart of a method of performing a repeater search, illustrating how the repeater identification system within the mobile station performs a repeater search.

At 90, a regular AFLT search is run on all pilot signals (e.g., from the active, candidate, and neighbor sets).

At 92, in order to begin operations efficiently, the "best" detected pilot from the regular AFLT search is determined. The selection of "best" pilot signal may be made based on any suitable criteria on the results of the regular AFLT search, such as pilot strength (Ec/Io), RMSE, and so forth, where the "best" pilot would be the one with the highest Ec/Io, lowest RMSE, and so forth, depending upon a variety of practical factors and design criteria.

At 94, a repeater identification search is run on the selected pilot, such as described with reference to FIGS. 7 and 8 above.

At 96, the mobile station determines whether sufficient repeater-screened PPMs have been obtained from the repeater search (i.e. sufficient repeater-screened PPMs for the purposes of the pre-fix or for determining the final position of the MS).

At 97, if sufficient repeater-screened PPMs have not been obtained, additional pilot(s) need to be selected for repeater screening.

At 98, the next "best" pilot is selected such as described with reference numeral 92 above. This process continues in a loop, repeating steps 94 and 96 with the next best pilot signal, and so on, until sufficient pilot measurements have been searched for repeater ID presence, to accurately determine the MS position for the pre-fix or final-fix.

At 99, once a sufficient number of PPMs have been screened for repeater information, the repeater AFLT search is done and the results are sent to the appropriate system for processing the position of the mobile station, such as the MS position determination system described elsewhere herein (FIG. 6 at 66) or a PDE. As described in more detail with reference to reference numerals 78 and 119, the repeater information may comprise an indication of whether or not the signal is successfully repeater-screened (e.g. the repeater search was not even attempted, or the repeaters search has been attempted but failed, or repeater search has been successfully performed), whether or not the signal is detected as repeated, and in some embodiments, the unique repeater ID associated with the repeated signal.

Reference is now made to FIG. 10, which illustrates an alternative method for performing a repeater search for multiple pilots, which may advantageously reduce the time to complete the repeater identification process. This method takes advantage of the fact that for stronger pilots with higher Ec/Io, the repeater identification process does not have to take as long as for the weaker pilots with lower Ec/Io, and still maintain the same identification performance (e.g., the same target probabilities of false alarm and identification). Thus, the repeater identification search sensitivity can be modified to enhance time-to-identify, and the shallow and deep searches can be decoupled, in order to provide quicker response for high Ec/Io scenarios.

In this embodiment, the repeater identification system still performs repeater identification on only as many "best" pilots detected from the regular AFLT search as necessary for accurate pre-fix or final-fix position location determination, but the repeater identification process itself is now allowed to be shorter based on the pilot signals strength (Ec/Io).

At 100, a regular AFLT search has been run on all pilot signals from the active, candidate, and neighbor sets, and the L best results of the regular AFLT search are sent to the repeater identification system to perform the repeater AFLT search thereon. The selection of "best" pilot signal may be made based on any suitable criteria on the results of the regular AFLT search, such as pilot strength (Ec/Io), RMSE, and so forth, where the "best" pilot would be the one with the highest Ec/Io, lowest RSME, and so forth, depending upon a variety of practical factors and design criteria.

At 101, the repeater identification system selects a first pilot in the set of L best pilots.

At 102, each pilot is grouped based on its Ec/Io strength into 4 pilot strength groups $S_{1,2,3,4}$, to be searched with 4 repeater identification searches of varying Ec/Io depths and thus varying search times. Grouping may be accomplished as follows: thresholds $Th_{1,2,3,4}$ are set (with $Th_1$ being the strongest and $Th_4$ being the weakest Ec/Io threshold), the Ec/Io measurement for a first pilot is compared with the first threshold ($Th_1$) and placed in group $S_1$ if found above that threshold, if not, the pilot is then compared with $Th_2$ and placed in group $S_2$ if found above that threshold, and so forth.

At 103, if more pilots remain in the L best results from the regular AFLT search, the loop continues until all L best pilots have been grouped.

At 104, a shortest and shallowest repeater identification search $S_1$ is performed first on all pilots in the $S_1$ strongest group in parallel. It may be noted that each of the four pilot strength groups $S_{1,2,3,4}$ have varying Ec/Io depths and thus varying search times. Thus, if all L "best" pilots detected in a regular AFLT search that need to be screened for repeaters have high Ec/Io (e.g. >Th1), the repeater identification will complete without having to perform any of the deep searches (e.g., all pilots will be searched for repeater IDs with the shallowest and thus shortest search $S_1$), thus minimizing the time necessary to complete repeater identification process.

At 105, if sufficient repeater-screened pilot phase measurements (i.e., repeater-screened PPMs) are obtained to determine the position of the MS, no more repeater searching is necessary.

At 106, the repeater search (i.e. step 104) is repeated on any remaining pilots in the search group until all pilots have been screened for repeater information, or until sufficient repeater measurements have been obtained for pre-fix and/or final positioning the MS.

At 107, steps 104 to 106 are repeated on the remaining groups ($S_{2,3,4}$) until there are no more search groups (e.g., i=4 in this example).

At 108, after sufficient repeater measurements have been obtained or no more search groups remain, processing is complete and appropriate measurements may be sent for pre-fix or final-fix (position determination) of the MS.

In some embodiments, a concept of preferred response quality may be incorporated, where different preferred response quality values are consistent with desired repeater search sensitivity, target probabilities, scope/yield and maximum allowable time-to-identify. In this manner, we can have different preferred response quality values for initial coarse position (i.e., pre-fix) and final position determination (i.e., final fix) repeater search, to allow for different maximum time-to-identify requirements between the two. Furthermore, we may have different preferred response quality values for final fix as well, to allow for possible differing requirements of various types of the application on the repeater detection process.

Preferred response quality value would set target detection process error probabilities, that will dictate $S_{1,2,3,4}$ search Ec/Io sensitivities, as well as choice of various other repeater search parameters, such as maximum and minimum number of pilots for which repeater search is to be performed, as well as maximum total time-to-identify. Search detection thresholds $Th_{1,2,3,4}$ could then be dynamically adjusted per repeater search, based on the obtained results from the regular AFLT search and the desired preferred response quality parameters, to further minimize total time-to-identify. For example, even though preferred response quality may be set for maximum allowable time-to-identify, if all the AFLT measurements that need to be screened for repeaters have high Ec/Io, then the thresholds $Th_{1,2,3,4}$ in the AFLT repeater search session should be dynamically adjusted such that no deep searches are performed, thus minimizing the actual time-to-identify.

As will be described in more detail in the next section, repeater searches (and thus repeater identification) may only be performed when necessary, i.e. only for pre-fix or only when the GPS search (if A-GPS is being performed) does not return enough GPS measurements to determine position location, in order to save processing time (MIPS) and shorten time-to-fix. One position location method will be described with reference to FIG. 11.

Example Method of Determining Position Using FLR-FWM

Figure 11:
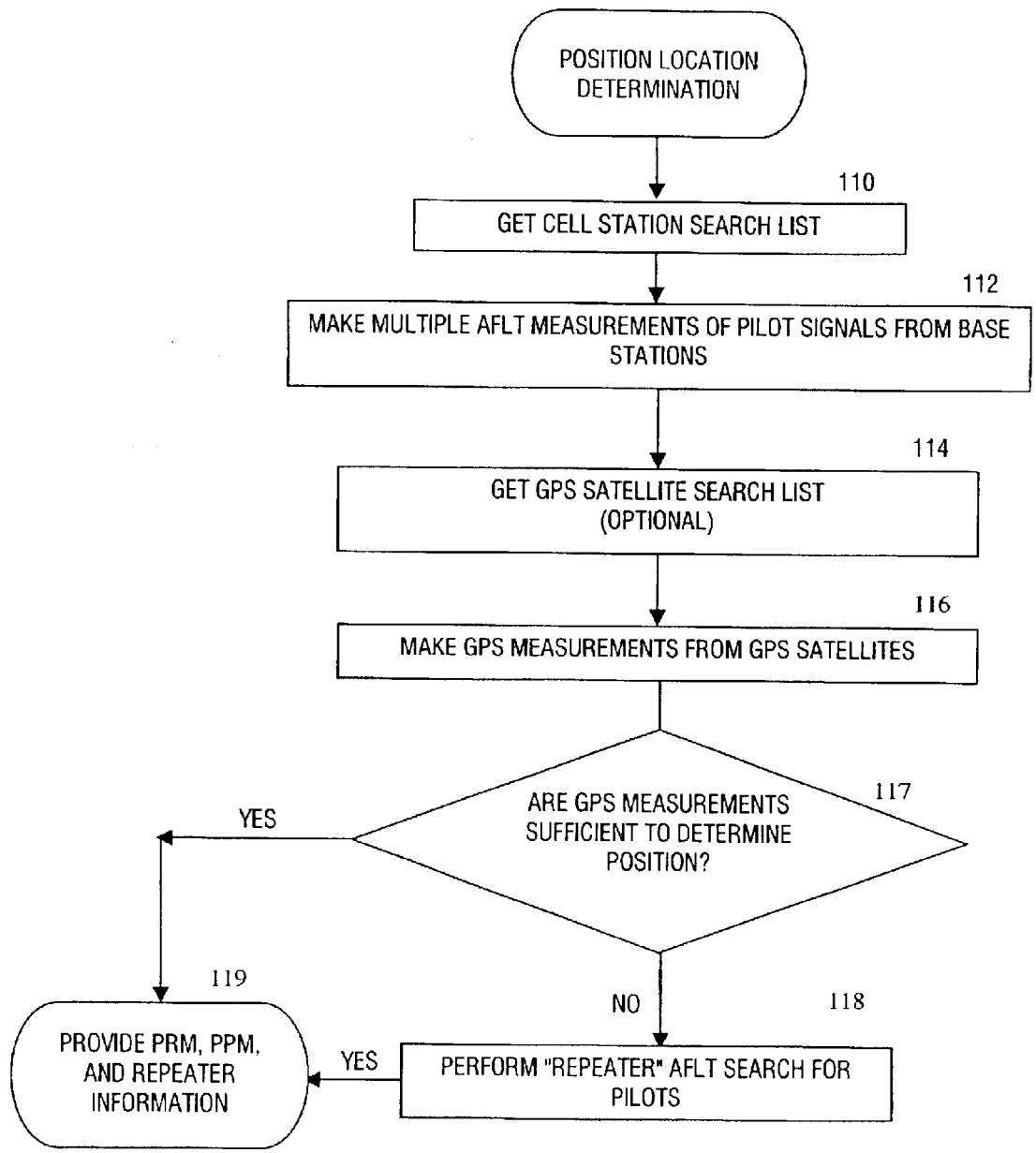
FIG. 11 is a flowchart of one example method of determining the position of the mobile station using an AFLT or A-GPS system in cellular coverage areas where repeaters are present.

FIG. 11 is a flowchart of one example method of determining position location of the mobile station using an AFLT or A-GPS in cellular coverage areas where repeaters are present. It should be apparent that many different methods of determining position may be implemented using the repeater identification system disclosed herein.

At 110, a search list of cellular BTS neighbors is obtained. The cell search list will be used to search for pilot signals from the cellular stations on the list, and it may also include information useful in finding the pilot signals of the stations on the list.

The cell search list may be obtained in a variety of ways; in one simple embodiment, the cell search list includes all possible pilot signals in a cellular system; however, searching all the possible pilot signals may consume an undesirable amount of time. In order to save time in one embodiment, a local cellular base station communicating with the mobile station can provide the cell search list for the mobile station, including the search windows over which to search for each pilot signal. Note that the cell search list could be modified to also include any repeater aiding information that is available to the serving base station, if any, such as all the possible repeaters on PNs in the list, their IDs, and their internal delays (and potentially their locations, if position location is to be performed at MS). This may aid in reduction of repeater time-to-identify and thus time-to-fix.

At 112, AFLT measurements are taken of the pilot signals from each cellular BTS on the cell search list. It may be noted that, even if the strength of a pilot signal is insufficient to establish communication, the pilot signal may still have enough strength to be detected and to be able to measure the time-of-arrival and other qualities.

In one embodiment, the AFLT measurements include an earliest time-of-arrival (TOA) estimate, an RMSE estimate of the path providing the earliest TOA, and an Ec/Io estimate for all resolvable paths of the pilot signal, which will be used to update the Ec/Io for the pilot signal. The measurements may be stored in a PPM database such as shown in FIG. 6 in which each pilot signal is associated with a plurality of related measurements.

At 114, a GPS satellite search list may be obtained. This is an optional operation, which advantageously provides a search list that can be used by the GPS system to look for satellites thereby reducing the time necessary to locate sufficient satellites to get a position fix. Alternatively, the GPS system can simply search the entire sky; however such a full sky search typically consumes a much longer time.

At 116, GPS measurements are obtained in accordance with suitable GPS procedures. In one embodiment, the GPS communication system first looks for the satellites specified in the viewable satellite list over the search windows specified in the list, which can significantly reduce the time required to obtain sufficient GPS signals.

At 117, the MS determines if sufficient GPS measurements have been obtained to determine position location. If sufficient measurements have been obtained, there is no reason to incur further processing in the MS, the processing goes to 119 in the flow diagram to provide appropriate pseudo-range measurements (as well as possibly PPMs from regular AFLT search and the repeater information indicating that the repeater search was not performed) to either the position determination system housed within the MS, or at a PDE located in the network external to the MS, but in cellular communication therewith. The position determination system or PDE processes the GPS measurements and returns the position location of the MS. If sufficient measurements have not been obtained, a repeater AFLT search 118 is run as described with reference to FIGS. 9 or 10, and as described with reference to 118 below.

At 118, a repeater AFLT search is performed on pilot signals obtained during the regular AFLT search, as described in more detail with reference to FIG. 9 or FIG. 10. Since the repeater search is performed on pilots already found in regular AFLT search, the searching is performed over small search windows, and the searcher is able to do them simultaneously. Based on current search technology, approximately 1 to 8 pilots can be researched for repeaters in parallel, depending on the target mobile station modem (MSM).

At 119, pseudo-range measurements (PRM) from the GPS search, pilot phase measurements (PPM) from the regular AFLT search, and repeater information from the repeater (AFLT) search may be provided to the position determination system housed within the MS or at the PDE at a location external to the MS, but in wireless communication therewith. The MS position determination system or PDE processes all these measurements to obtain MS position location.

It may be noted that in some embodiments where the detection only capability of a repeated signal is provided within the watermark (i.e., no unique repeater ID), then the repeater information gathered by the repeater search will indicate whether or not the signal is successfully repeater-screened (e.g. the repeater search was not even attempted, or the repeaters search has been attempted but failed, or repeater search has been successfully performed), and if so, whether or not the signal is repeated. In these embodiments, the MS position determination system or PDE may then choose to determine the position of the MS by excluding the PPM measurements for repeated signals and for the signals that were not successfully repeater-screened.

It may also be noted that in some embodiments, if the repeater ID is provided within the watermark waveform, the repeater information gathered by the repeater search will also include the repeater ID extracted from the watermark waveform, if any signals are repeated. In these embodiments, the MS position determination system or PDE may then utilize information about the identified repeaters (e.g., their location and internal delays) to calculate the position of the mobile with the PPMs of repeated signals included.

It may be noted that for call flows that involve calculations of the initial coarse position (i.e., pre-fix) based on the AFLT measurements for the purposes of creating more accurate GPS aiding information (smaller GPS windows), a "repeater" AFLT search should be performed prior to using the regular AFLT search measurements in the pre-fix calculation in order to provide more accurate GPS search windows.

Example Implementation of FLRFWM

In one example embodiment, the FLRFWM is applied to a CDMA system to optimize position location performance. The results of the example implementation, for reasonable target error event probabilities, such as false alarm probability (PFA), probability of missed detection ($P_{MISSDET}$), and probability of missed identification ($P_{MISSID}$) of about $10^{-2}$, include identification of a FL frequency watermark for pilots down to about −16.9 dB in about 358 microseconds (ms), −19.2 dB in about 712 ms, −21.2 dB in about 1.423 sec, and −23.1 dB in about 2.844 sec.

In this example implementation, the modulation waveform applied to the forward link signal by the FM modulator is a periodic square wave of magnitude $+/-f_A$ and period of 2T, where $f_A$ in this example implementation is 50 Hz, and T is in [10*64: inc:11*64] chip range. It should be noted that the increment inc is chosen to achieve uniform spacing of watermarks in frequency for easier detection, and the value is then truncated to nearest chipx8 clock. In this example, the resulting frequencies of the watermark waveform are in the range of about 872.72 HZ to 960 Hz with a uniform separation of about 2.815 Hz; minimal degradation in FL CDMA performance due to the frequency watermark is achieved.

It may be noted that a limitation is that this example can be done only for limited number (e.g., 32) of repeater IDs, requiring some provisioning algorithm to be implemented elsewhere in the system. FLRFWM-based schemes may therefore be more suitable for carrier deployed sector repeaters, where the carrier could run a provisioning algorithm as part of the repeater deployment, than for personal repeaters where provisioning schemes may be hard to implement or where number of repeaters could grow beyond what forward link fast frequency watermark-based schemes can support.

It may also be noted that, as desired, frequency tracking loops are not tracking out the frequency watermark waveform, because the slowest repeater watermark has maximum T ($T_{MAX}$) of about ⅟₆₀ th of the time constant of frequency tracking loops. The resulting ac ripple is about +/−3.0 Hz at PCS frequency (which is equivalent to about 2.5 Hz at GPS frequency), while an average estimated frequency error of 0 Hz is achieved; therefore, the watermark does not significantly impact either GPS or AFLT performance.

The example implementation uses the repeater ID detector described with reference to FIG. 8. It should be noted that two sets of cross-products are done in parallel on $N_{PRE}$-chip coherent sums that are offset by $N_{PRE}/2$-chips, rather than reducing $N_{PRE}$ from its maximum possible value, in order to reduce repeater ID detector SNR sampling phase dependency without having to pay a resulting penalty in detector SNR. $N_{PRE}$ is set to the maximum possible value of $T_{MIN}/2$ (e.g., 5*64 CDMA chips in the example implementation) in order to maximize the processing gain necessary for a target false alarm, detection and identification probabilities over range of pilot Ec/Io strengths of interest. The design limitation on max $N_{PRE}$ is due to the cross-product practical pull-in range of $f_C/(4T_{CPD})$ constraint, where $T_{CPD}$ is the cross product update rate in CDMA chips, as discussed elsewhere herein. A frequency correlator is run on 32 repeater ID frequencies to identify the FL frequency watermark. Coherent accumulation length after complex rotation of 2*1364 is chosen for $N_{POST}$ such that frequency bin size is small enough to be able to resolve repeater signature separation in frequency (here 2.815 Hz). Increasing $N_{POST}$ beyond this value would increase processing gain somewhat (significantly less than increase in $N_{PRE}$, as will be discussed below), however possibly increasing the time-to-fix.

Finally, for a sensitivity of Ec/Io=−16.9 dB, only one non-coherent accumulation is necessary (i.e., M=1), for Ec/Io=−19.2 dB, M=2, for Ec/Io=−21.2 dB, M=4, and for sensitivity of Ec/Io=23.1 dB, M=8.

Assuming we are searching over small search windows, since we are re-searching pilots already found in regular AFLT search, and considering the time to do a cross-product and a frequency correlation on 32 repeater ID frequencies as a background task defined by $T_{FC}$, the time-to-identify would be approximately $(N_{PRE}N_{POST}M+T_{FC})$ chips per pilot. Thus, if we estimate $T_{FC}$ to be about 2 ms, then time-to-detect becomes about 358 ms per pilot, for search $S_1$ with Ec/Io sensitivity of −16.9 dB.

It should be noted that in order to save time-to-identify and processing time (MIPS), a repeater search can be performed only when necessary, that is, whenever AFLT-based pre-fix is desired, and for final-fix only when the GPS search does not return sufficient measurements to determine the position of the mobile station.

It should also be noted that the number of non-coherent sums can be different for pre-fix and final-fix (i.e., initial and final AFLT searches), and can also be dynamically adjusted, if desired, based on the results of the regular AFLT search and desired preferred response quality, as already discussed. A shorter, less sensitive repeater AFLT search could be performed for pre-fix, and either shorter or longer/more sensitive repeater AFLT search could be performed for final fix, as needed, based on the results of the regular AFLT search and the desired preferred response quality. The repeater identification search may follow the method illustrated in FIG. 10.

The choice of the modulation waveform for the watermark and its characteristics are designed to satisfy four contradicting conditions: minimal adverse impact on FL performance, as well as AFLT and GPS performance, maximum detection and identification probability, and minimal time-to-identify.

In order to minimize impact on FL performance, the watermark may be designed to result in the minimal degradation in FL CDMA SNR, that is, an average loss not to exceed 0.2 dB, by minimizing phase deviation through minimizing $T_{MAX}$ and $f_A$. Additionally, minimal adverse impact on GPS and AFLT performance may be achieved by ensuring that frequency tracking loops are not tracking out the frequency watermark waveform, by selecting a small enough value of $T_{MAX}$ for the modulation waveform such that the watermark is not detectable by the FTL, such as described elsewhere herein; that is, no contribution to mean and minimal contribution to variance should be seen in the FTL and maximum increase in peak-to-peak ripple should be no more than about several Hz.

The choice of the maximum value of T ($T_{MAX}$) and the amplitude of the frequency ($f_A$) are designed to balance the two contradictory requirements; that is, minimizing degradation on FL CDMA, AFLT and GPS performance, which minimizes $f_A$ and $T_{MAX}$, while maximizing $f_A$ and $T_{MAX}$ for best detection and identification probability. For example, to minimize adverse effect of the watermark waveform on FL performance, $T_{MAX}$ was chosen to be 11*64 chips and $f_A$ at most +/−50 Hz; these maximum allowable values were chosen for these parameters in order to maximize repeater detection and identification probability. This $T_{MAX}$ is about $\frac{1}{60}^{th}$ of the fastest time constant of FLT (where the fastest time constant is defined for tracking a PCS pilot of −3.0 dB), such that the worst case resulting variation for the slowest changing watermark waveform with period of $2T_{MAX}$ at GPS frequency is +/−2.5 Hz, and the worst case CDMA code Doppler is about +/−3.0 Hz, which results in minimal adverse impact on GPS and AFLT performance.

It can be shown that the repeater ID search output SNR at the input of the non-coherent stage is approximately equal to $$SNR_{repIDsearch} \approx 10 \cdot \log\left((\pi \cdot T_c)^2 \cdot \frac{\alpha}{k} \cdot N_{POST} \cdot N_{PRE}^4 \cdot f_A^2 \cdot \frac{E_C^2 \cdot \text{sinc}^4(f_A \cdot T_c \cdot N_{PRE})}{\sigma_n^2 \cdot (\sigma_n^2 + N_{PRE} \cdot E_C \cdot \text{sinc}^2(f_A \cdot T_c \cdot N_{PRE}))}\right)$$

where $T_c$ is the CDMA chip period=$1/f_C$, Ec is the pilot energy over CDMA chip, $\square_n$ is noise standard deviation of pilot sample, $\square$ is loss in cross-product output power from ideal in dB, and k is increase in noise variance due to correlation of adjacent cross-product noise samples. Also note that increasing the repeater ID detector output SNR will result in increase of the detection and identification probability. From this expression, it is evident that largest increase in repeater ID detector SNR (and thus detection and identification probabilities) can be achieved by increasing $N_{PRE}$, followed by increasing $f_A$.

The upper design limit on the frequency of the watermark waveform (lower limit on $T_{MIN}$) may be selected by balancing the detection probability and time-to-identify. For minimal time-to-identify, $T_{MIN}$ should be minimized, while for maximum repeater ID detection probability, $T_{MIN}$ should be maximized. Namely, $T_{MIN}$ will determine the detector SNR, through imposing a maximum possible $N_{PRE}$. To ensure sampling the fastest watermark waveform at Nyquist rate, the maximum $N_{PRE}$ should be set at $T_{MIN}$. Additionally, the cross-product discriminator's practical pull-in range of $f_C/(4T_{CPD})$, where $T_{CPD}$ is the cross-product update rate and is equal to $N_{PRE}$ CDMA chips, limits the maximum $N_{PRE}$. Namely, the largest watermark frequency, $f_{MAX}=f_C/(2T_{MIN})$, should not exceed the edge of cross-product practical pull-in range; as a result, the max value of $N_{PRE}$ is $T_{MIN}/2$. $N_{PRE}$, in turn, will have the largest impact on repeater ID detector SNR, as discussed above. In this example implementation, the above considerations are combined and the best overall $T_{MIN}$ is about 10*64 chips.

It will be appreciated by those skilled in the art, in view of these teachings, that alternative embodiments may be implemented without deviating from the spirit or scope of the invention. This invention is to be limited only by the following claims, which include all such embodiments and modifications when viewed in conjunction with the above specification and accompanying drawings.

What is claimed is:

1. A repeater for amplifying a forward link signal from a base station to a mobile station, wherein the mobile station has a frequency tracking loop, the repeater comprising:
   an amplifier for amplifying the forward link signal from the base station to the mobile station; and
   a fast frequency modulator that frequency modulates the forward link signal with an identifying fast frequency watermark as it passes through the repeater, wherein said watermark has a frequency such that the frequency tracking loop substantially does not detect said watermark at said mobile station.

2. The repeater of claim 1 wherein said watermark comprises a waveform that is non-periodic.

3. The repeater of claim 2 wherein said non-periodic waveform comprises one of BPSK-, QPSK-, and OQPSK-encoded waveform having a bit duration of 2T, wherein T is substantially less than the time constant of the mobile station frequency tracking loop.

4. The repeater of claim 3, wherein said non-periodic waveform has an amplitude less than or equal to about 50 Hz.

5. The repeater of claim 3, wherein T is less than about 1/60 of the time constant of the frequency tracking loop.

6. The repeater of claim 3 where said non-periodic watermark waveform uniquely identifies the repeater by having a unique sequence of bits.

7. The repeater of claim 1 wherein said watermark is substantially periodic with a period of 2T wherein T is substantially less than the time constant of the mobile station frequency tracking loop.

8. The repeater of claim 7, wherein T is less than about 1/60 of the time constant of the frequency tracking loop.

9. The repeater of claim 7, wherein fast frequency watermark amplitude is less than or equal to about 50 Hz.

10. The repeater of claim 7, wherein said periodic waveform comprises a periodic square waveform.

11. The repeater of claim 10, wherein said periodic square waveform has an amplitude less than or equal to about 50 Hz.

12. The repeater of claim 11, wherein said amplitude is about 50 Hz.

13. The repeater of claim 7, wherein said watermark waveform identifies the repeater by having a unique value of T.

14. A mobile station for receiving a plurality of forward link pilot signals and identifying the presence of a fast frequency watermark waveform to determine whether any of said forward link signals are repeated, said mobile station comprising:
  a receiver for receiving forward link signals;
  a frequency tracking loop for enabling accurate demodulation of the forward link signals;
  an AFLT searcher for detecting pilots and performing pilot phase measurements including measuring the times of arrival of said plurality of forward link pilot signals; and
  a repeater identification system configured to detect and identify the watermark, if any, and thereby identify a repeated forward link signal, wherein said repeater identification system searches the forward link signal for the watermark to retrieve the watermark waveform that uniquely identifies the repeater, the watermark waveform having a frequency such that the frequency tracking loop substantially does not detect said watermark.

15. The mobile station of claim 14, wherein said repeater identification system comprises:
  means for accumulating a series of pilot signal samples;
  means for retrieving watermark waveforms from said pilot signal samples, if any, by calculating cross-products of consecutive sums of pilot signal samples; and
  means for performing frequency correlation on said watermark waveforms, if any, to determine its frequency that uniquely identifies the repeater.

16. The mobile station of claim 14 wherein said repeater identification system comprises means for demodulating a BPSK-modulated watermark waveform.

17. The mobile station of claim 14 wherein said demodulation means comprises a matched filter-based demodulator.

18. The mobile station of claim 14, further comprising a GPS receiver for receiving GPS signals.

19. The mobile station of claim 18, wherein said repeater identification system further comprises means for skipping the searching of the forward link signal for the watermark if said GPS receiver produces a sufficient number of measurements to accurately determine position location of the mobile station.

20. A method for determining position location information of a mobile station from the forward link of a plurality of pilot signals, the method comprising:
  performing an AFLT search in the mobile station to detect pilots and measure an earliest time-of-arrival of said plurality of pilot signals;
  selecting a first pilot signal located during said AFLT search;
  repeater-screening said first pilot signal by performing a repeater AFLT search on said first pilot signal, including searching for a fast frequency watermark waveform that identifies a repeated signal, wherein said watermark waveform has a frequency such that a frequency tracking loop in said mobile station substantially does not detect said watermark at said mobile station;
  repeating said steps of performing and repeater-screening for a plurality of other selected pilot signals until a sufficient number of repeater-screened pilot signals to determine a position location of the mobile station is obtained; and
  providing pilot phase measurements and repeater information for the pilot signals obtained in said AFLT search to one of a mobile station position determining system and a network position determination entity to determine the position of said mobile station.

21. The method of claim 20, wherein said repeater information identifies whether or not the signal is successfully repeater-screened, and if so, whether or not the signal is repeated, such that said one of a mobile station position determining system and a network position determination entity determines the position of the mobile station by excluding measurements from repeated pilot signals and from the pilot signals that were not successfully repeater-screened.

22. The method of claim 20 further comprising identifying a repeater ID from said watermark waveform.

23. The method of claim 22, wherein the step of providing repeater information includes providing information on whether the pilot signal is successfully repeater-screened, and if so, whether or not the signal is repeated, and if so, also providing said repeater ID for pilot signals identified as repeated, such that said one of a mobile station position determining system and a network position determination entity may include measurements from repeated pilot signals in position calculation.

24. The method of claim 22, wherein said repeater AFLT search comprises:
  accumulating pilot signals samples from an AFLT searcher;
  retrieving the frequency watermark waveform by calculating cross-products of consecutive pilot signal samples sums; and
  performing frequency correlation to determine the watermark waveform frequency that corresponds to said repeater ID.

25. The method of claim 22, wherein said repeater AFLT search comprises matched filter-based demodulation to decode said repeater ID from a fast frequency watermark encoded by BPSK.

26. The method of claim 20, further comprising performing a GPS search prior to the step of performing a repeater AFLT search.

27. The method of claim 26, wherein if said GPS search produces a sufficient number of measurements to accurately determine position location of the mobile station, then the step of repeater-screening is skipped.

28. A method for retrieving repeater information from a pilot signal, if any, in a mobile station, the method comprising:
  performing a repeater identification search in the mobile station on a first pilot signal, including searching for a fast frequency watermark waveform that identifies a repeated signal on the forward link of said first pilot signal, wherein said watermark waveform has a frequency such that a frequency tracking loop in said mobile station substantially does not detect said watermark at said mobile station; and
  providing pilot phase measurements and repeater information for position location determination.

29. The method of claim 28, wherein said repeater information identifies whether or not the signal is successfully repeater-screened, and if so, whether or not the signal is repeated, such that said one of a mobile station position determining system and a network position determination entity determines the position of the mobile station by excluding measurements from repeated pilot signals and from the pilot signals that were not successfully repeater-screened.

30. The method of claim 28 further comprising identifying a repeater ID from said watermark waveform.

31. The method of claim 30, wherein the step of providing repeater information includes providing the information on whether the pilot signal is successfully repeater-screened, and if so, whether or not the signal is repeated, and if so, also providing said repeater ID for pilot signals identified as repeated, such that said one of a mobile station position determining system and a network position determination entity may include measurements from repeated pilot signals in position calculation.

32. The method of claim 30, wherein said repeater identification search comprises:

accumulating pilot signals samples from a pilot searcher;

retrieving frequency watermark waveform by calculating cross-products of consecutive pilot signal samples sums; and performing frequency correlation to determine the watermark waveform frequency that corresponds to said repeater ID.

33. The method of claim 30, wherein said repeater identification search comprises matched filter-based demodulation to decode a fast frequency watermark encoded by BPSK.

34. The method of claim 28, further comprising performing a GPS search prior to the step of performing a repeater identification search.

35. The method of claim 34, wherein if said GPS search produces a sufficient number of measurements to accurately determine position location of the mobile station, then the step of performing a repeater identification search is skipped.

* * * * *